United States Patent
Li et al.

(10) Patent No.: US 11,870,254 B2
(45) Date of Patent: Jan. 9, 2024

(54) MULTI-TERMINAL DIFFERENTIAL PROTECTION SETTING METHOD FOR DISTRIBUTED GENERATOR T-CONNECTED DISTRIBUTION NETWORK

(71) Applicant: Tianjin University, Tianjin (CN)

(72) Inventors: Botong Li, Tianjin (CN); Fahui Chen, Tianjin (CN); Bin Li, Tianjin (CN); Jing Zhang, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/301,023

(22) Filed: Apr. 14, 2023

(65) Prior Publication Data
US 2023/0253786 A1 Aug. 10, 2023

(30) Foreign Application Priority Data
Mar. 1, 2023 (CN) .......................... 202310182206.X

(51) Int. Cl.
*H02J 3/00* (2006.01)
*H02J 3/38* (2006.01)

(52) U.S. Cl.
CPC .............. *H02J 3/001* (2020.01); *H02J 3/381* (2013.01); *H02J 2203/20* (2020.01); *H02J 2300/24* (2020.01)

(58) Field of Classification Search
CPC ........ H02J 3/001; H02J 3/381; H02J 2203/20; H02J 2300/24
See application file for complete search history.

(56) References Cited

U.S. PATENT DOCUMENTS

| | | |
|---|---|---|
| 2003/0208640 A1 | 11/2003 | Just |
| 2010/0295377 A1 | 11/2010 | Sok et al. |
| 2019/0245353 A1* | 8/2019 | Varma ....................... H02J 3/01 |

* cited by examiner

*Primary Examiner* — Charles Cai

(57) ABSTRACT

The present invention proposes a multi-terminal differential protection setting method for a distributed generator T-connected distribution network. The present invention can accurately identify internal faults and external faults of the protected area in the high-proportion distributed generator T-connected distribution network, with sufficient reliability and sensitivity.

6 Claims, 14 Drawing Sheets

MULTI-TERMINAL DIFFERENTIAL PROTECTION SETTING METHOD FOR DISTRIBUTED GENERATOR T-CONNECTED DISTRIBUTION NETWORK

TECHNICAL FIELD

The present invention relates to the technical field of electrical technologies, and particularly relates to a multi-terminal differential protection setting method for a distributed generator T-connected distribution network.

BACKGROUND

Building a new power system based on clean and low-carbon energy is a key measure to implement the two-carbon strategy. Large-scale multi-point connection of a distributed generator into a distribution network is one of the most important forms of new energy interconnection. In the vast rural distribution networks, inverter interfaced distributed generators (IIDGs) such as photovoltaic type and energy storage type are basically connected into the distribution network by means of T-connection. How to realize the differential protection after multi-point T-connection of high-proportion IIDGs into the distribution network has drawn much attention in the industry. For a distribution network containing T-connected IIDGs, two-terminal differential protection usually includes the current of T-connected lines into the protection action threshold, and the characteristics of the protection action are affected by the capacity of the T-connected IIDGs. When the capacity of the connected IIDGs is large, refused operation of fault protection will occur in the area. With the development of communication technologies and the wide application of primary and secondary fusion intelligent switches, multi-terminal differential protection has become a feasible and even preferable solution. In terms of the principle and scheme of multi-terminal differential protection for a distribution network applicable to multi-point T-connected lines, some scholars have proposed a multi-point T-connected line differential protection scheme based on master-slave topology, which can accurately identify internal and external faults of the area to a certain extent, but does not fully consider the influence of fault characteristics of the IIDGs on the amplitudes and phases of differential current and braking current. Some scholars have proposed a differential protection scheme based on the amplitude-phase relationship of multi-terminal current, which considers the influence of fault characteristics of the IIDGs on differential current, but does not fully consider the influence of the data synchronization error on differential current. Some scholars have studied the possibility of refused operation and maloperation of multi-terminal differential protection caused by the data synchronization error based on the engineering example of T-connected lines in the distribution network, which proves that the data synchronization error will have a certain effect on the performance of multi-terminal differential protection.

In the prior art, internal faults and external faults of the protected area cannot be accurately identified in the high-proportion distributed generator T-connected distribution network, the calculated result of the differential current of superimposed multi-terminal current phasor errors is not accurate, and the speed for calculating the overall maximum error of differential current of superimposed multi-terminal current phasor errors is low.

SUMMARY

To solve the above problem, the purpose of the present invention is to propose a multi-terminal differential protection setting method for a distributed generator T-connected distribution network, which can accurately identify internal faults and external faults of the protected area in the high-proportion distributed generator T-connected distribution network, with sufficient reliability and sensitivity, and can quickly and accurately calculate the overall maximum error of differential current of superimposed multi-terminal current phasor errors.

To achieve the above technical purpose, the present invention provides a multi-terminal differential protection setting method for a distributed generator T-connected distribution network, comprising the following steps:

S1: Connecting a distributed generator into a distribution network by means of T-connection, and making the distributed generator equivalent to a positive sequence current source controlled by grid interconnection voltage;

S2: Acquiring multi-terminal current according to the positive sequence current source controlled by grid interconnection voltage;

S3: Calculating the overall maximum error of superimposed multi-terminal current errors according to the multi-terminal current;

S4: Establishing non-convex constraint space according to the overall maximum error of superimposed multi-terminal current errors;

S5: Reducing and discretizing the non-convex constraint space;

S6: Obtaining the optimization problem of the non-convex constraint space based on the reducing and discretizing results of the non-convex constraint space;

S7: Solving the optimization problem of the non-convex constraint space;

S8: Analyzing and verifying the solution result of the optimization problem of the non-convex constraint space.

Preferably, in step S1, an equivalent model for making the distributed generator equivalent to a positive sequence current source controlled by grid interconnection voltage is:

$$U^*_{pcc(1)} = U_{pcc(1)}/U_{pcc(1).N} \qquad (1)$$

$$I_{DGm.N} = \sqrt{2}\, P_{ref.N}/3 U_{pcc(1).N}$$

$$i_{q(1)} = \begin{cases} 0, & U^*_{pcc(1)} > 0.9 \\ -2(1 - U^*_{pcc(1)})I_{DGm.N}, & 0.4 \le U^*_{pcc(1)} \le 0.9 \\ -1.2 I_{DGm.N}, & U^*_{pcc(1)} < 0.4 \end{cases}$$

$$i_{d(1)} = \min\left(\frac{\sqrt{2}\, P_{ref}}{3 U_{pcc(1)}},\, \sqrt{(1.2 I_{DGm.N})^2 - i_{q(1)}^2}\right)$$

$$i_{DG} = \begin{cases} \dfrac{\sqrt{i_{d(1)}^2 + i_{q(1)}^2}}{\sqrt{2}} \angle\left(\arctan\dfrac{i_{q(1)}}{i_{d(1)}} + \varphi\right), & i_{d(1)} \ne 0 \\ \dfrac{\sqrt{i_{d(1)}^2 + i_{q(1)}^2}}{\sqrt{2}} \angle(-90° + \varphi), & i_{d(1)} = 0 \end{cases}$$

wherein $U_{pcc(1)}$ is an effective value of grid interconnection positive sequence phase voltage, $U_{pcc(1).N}$ is an effective value of grid interconnection positive sequence phase voltage in the rated running state, $I_{DGm.N}$ is an amplitude of rated current, $P_{ref.N}$ is a rated active reference value, $P_{ref}$ is an active reference value before failure, $\dot{I}_{DG}$ is output current, $i_{d(1)}$ and $i_{q(1)}$ are a d-axis component and a q-axis component of the positive sequence component of the output current, and $\varphi$ is the phase of $\dot{U}_{pcc(1)}$.

Preferably, step S3 of calculating the overall maximum error of superimposed multi-terminal current errors according to the multi-terminal current comprises:

Expressing the power frequency current phasor involved in a group of n(n≥3)-terminal current differential protection by a set P:

$$P=\{\dot{I}_1, \dot{I}_2, \ldots, \dot{I}_n\} \quad (2)$$

The action criterion of the multi-terminal current differential protection is:

$$I_{op} \geq I_{set} \quad (3)$$

wherein $I_{op}$ is differential current; and $I_{set}$ is a protection setting value;

Expressing the relationship between the measured value and the actual value of each power frequency current phasor as follows:

$$\dot{I}_{i.ms} = \dot{I}_{i.tr} + \Delta\dot{I}_i \quad (4)$$

i=1, 2, . . . , n wherein $\dot{I}_{i.ms}$ represents the measured value of the power frequency current phasor, $\dot{I}_{i.tr}$ represents the actual value of the power frequency current phasor, and $\Delta\dot{I}_i$ represents the error between the actual value and the measured value;

At this moment, the differential current is:

$$I_{op} = |\dot{I}_{1.ms} + \dot{I}_{2.ms} + \ldots + \dot{I}_{n.ms}| \quad (5)$$
$$= |\dot{I}_{1.tr} + \Delta\dot{I}_1 + \dot{I}_{2.tr} + \Delta\dot{I}_2 + \ldots + \dot{I}_{n.tr} + \Delta\dot{I}_n|$$

According to the Kirchhoff's Current Law, meeting the formula below during normal operation and during failure outside a protected area:

$$\dot{I}_{1.tr} + \dot{I}_{2.tr} + \ldots + \dot{I}_{n.tr} = 0 \quad (6)$$

According to formula (5) and formula (6), the differential current during normal operation and during failure outside a protected area is:

$$I_{op} = |\Delta\dot{I}_1 + \Delta\dot{I}_2 + \ldots + \Delta\dot{I}_n| \quad (7)$$

Denoting the overall maximum error of superimposed multi-terminal current errors as $\Delta I_\Sigma$:

$$\Delta I_\Sigma = |\Delta\dot{I}_1 + \Delta\dot{I}_2 + \ldots + \Delta\dot{I}_n| \quad (8)$$

Preferably, step S4 of establishing non-convex constraint space according to the overall maximum error of superimposed multi-terminal current errors comprises:

According to $\Delta\dot{I}^*_1, \Delta\dot{I}^*_2, \ldots, \Delta\dot{I}^*_{n-1}, \Delta\dot{I}^*_n$, establishing a sector shadow area, wherein the phasors of $\Delta\dot{I}^*_1, \Delta\dot{I}^*_2, \ldots, \Delta\dot{I}^*_{n-1}, \Delta\dot{I}^*_n$ end on the boundaries of the respective sector shadow area;

If the position relationship between $\Delta\dot{I}^*_1 + \Delta\dot{I}^*_2 + \ldots + \Delta\dot{I}^*_{n-1}$ and $\Delta\dot{I}^*_n$ in a complex plane is that $\Delta\dot{I}^*_1 + \Delta\dot{I}^*_2 + \ldots + \Delta\dot{I}^*_{n-1}$ and $\Delta\dot{I}^*_n$ are at an angle of $\theta^*_n$;

wherein $\theta^*_n$ is the phase difference between phasors $\Delta\dot{I}^*_1 + \Delta\dot{I}^*_2 + \ldots + \Delta\dot{I}^*_{n-1}$ and $\Delta\dot{I}^*_n$, and $\theta^*_n \in [0, 2\pi)$;

According to the Law of Cosines, $\Delta I_{\Sigma.max}^2$ is:

$$\Delta I_{\Sigma.max}^2 = \quad (14)$$
$$|\Delta\dot{I}^*_1 + \Delta\dot{I}^*_2 + \ldots + \Delta\dot{I}^*_{n-1} + \Delta\dot{I}^*_n|^2 = |\Delta\dot{I}^*_1 + \Delta\dot{I}^*_2 + \ldots + \Delta\dot{I}^*_{n-1}|^2 +$$
$$|\Delta\dot{I}^*_n|^2 - 2 \cdot |\Delta\dot{I}^*_n| \cdot |\Delta\dot{I}^*_1 + \Delta\dot{I}^*_2 + \ldots + \Delta\dot{I}^*_{n-1}| \cos(\pi - \theta^*_n)$$

Denoting $\Delta\dot{I}^*_n$ having the phase difference of $\theta^*_n$ from $\Delta\dot{I}^*_1 + \Delta\dot{I}^*_2 + \ldots + \Delta\dot{I}^*_{n-1}$ as $\Delta\dot{I}_n^{\theta_n^*}$, and denoting $\Delta\dot{I}_n^{\theta_n^*}$ ending on the boundaries of the shadow area as $\Delta\dot{I}_n^{\theta_n^*, max}$;

Since $\Delta\dot{I}^*_1, \Delta\dot{I}^*_2, \ldots, \Delta\dot{I}^*_{n-1}, \Delta\dot{I}_n^{\theta_n^*}$ are independent of each other, the derivative of $\Delta I_\Sigma^2$ with respect to $|\Delta\dot{I}_n^{\theta_n^*}|$ is:

$$\frac{d(\Delta I_\Sigma^2)}{d(|\Delta\dot{I}_n^{\theta_n^*}|)} = 2|\Delta\dot{I}_n^{\theta_n^*}| - 2 \cdot \cos(\pi - \theta^*_n) \cdot |\Delta\dot{I}^*_1 + \Delta\dot{I}^*_2 + \ldots + \Delta\dot{I}^*_{n-1}| \quad (15)$$

The second derivative of $\Delta I_\Sigma^2$ with respect to $|\Delta\dot{I}_n^{\theta_n^*}|$ is:

$$\frac{d^2(\Delta I_\Sigma^2)}{d(|\Delta\dot{I}_n^{\theta_n^*}|)^2} = 2 > 0 \quad (16)$$

According to formula (14) to formula (16), since the quadratic term coefficients of the second derivative and the first derivative are both larger than 0, as $|\Delta\dot{I}_n^{\theta_n^*}|$ changes from 0 to $|\Delta\dot{I}_n^{\theta_n^*, max}|$, $\Delta I_\Sigma$ has at most one extreme point which is a minimum point;

$\Delta I_\Sigma$ is maximum when $\Delta\dot{I}_n^{\theta_n^*} = 0$ or $\Delta\dot{I}_n^{\theta_n^*} = \Delta\dot{I}_n^{\theta_n^*, max}$;

At least one $\Delta\dot{I}_n^\xi$ inevitably exists in the sector shadow area so that:

$$|\Delta\dot{I}^*_1 + \Delta\dot{I}^*_2 + \ldots + \Delta\dot{I}^*_{n-1} + \Delta\dot{I}_n^\xi| > |\Delta\dot{I}^*_1 + \Delta\dot{I}^*_2 + \ldots + \Delta\dot{I}^*_{n-1} + 0| \quad (17)$$

When the overall error of superimposed multi-terminal current errors is maximum, $\Delta\dot{I}^*_n = \Delta\dot{I}_n^{\theta_n^*, max}$;

Numbering four boundaries of the sector shadow area corresponding to $\Delta\dot{I}_n$, The boundaries 1 and 2 are straight boundaries, and the boundaries 3 and 4 are arc boundaries;

wherein $\Delta\dot{I}_n$ ending on the boundary 1 can be decomposed into:

$$\Delta\dot{I}_n = \Delta\dot{I}^*_{n,x} + \Delta\dot{I}_{n,y} \quad (18)$$

wherein $\Delta\dot{I}^*_{n,x}$ is the projection of $\Delta\dot{I}_n$ on the vertical line of the boundary 1, and $\Delta\dot{I}_{n,y}$ is the projection of $\Delta\dot{I}_n$ on the boundary 1;

When $\Delta\dot{I}^*_{n,y}$ ends near the $A_1$ side, $\Delta I_{\Sigma.max}^2$ is:

$$\Delta I_{\Sigma.max}^2 = |\Delta\dot{I}^*_1 + \Delta\dot{I}^*_2 + \ldots + \Delta\dot{I}^*_{n-1} + \Delta\dot{I}^*_n|^2 = \quad (19)$$
$$|\Delta\dot{I}^*_1 + \Delta\dot{I}^*_2 + \ldots + \Delta\dot{I}^*_{n-1} + \Delta\dot{I}^*_{n,x} + \Delta\dot{I}^*_{n,y}|^2 = |\Delta\dot{I}^*_1 + \Delta\dot{I}^*_2 + \ldots + \Delta\dot{I}^*_{n,x}|^2 +$$
$$|\Delta\dot{I}^*_{n,y}|^2 - 2 \cdot |\Delta\dot{I}^*_{n,y}| \cdot |\Delta\dot{I}^*_1 + \Delta\dot{I}^*_2 + \ldots + \Delta\dot{I}^*_{n,x}| \cos\left(\frac{\pi}{2} - \delta^*_n\right)$$

wherein $\delta^*_n$ is the phase difference between $\Delta\dot{I}^*_1 + \Delta\dot{I}^*_2 + \ldots + \Delta\dot{I}^*_{n-1}$ and $\Delta\dot{I}^*_{n,x}$, and $\delta^*_n \in [0, 2\pi)$;

Since $\Delta\dot{I}^*_1, \Delta\dot{I}^*_2, \ldots, \Delta\dot{I}^*_{n-1}, \Delta\dot{I}^*_{n,x}, \Delta\dot{I}_{n,y}$ are independent of each other, the derivative of $\Delta I_\Sigma^2$ with respect to $|\Delta\dot{I}_{n,y}|$ is:

$$\frac{d(\Delta I_\Sigma^2)}{d(|\Delta\dot{I}_{n,y}|)} = 2|\Delta\dot{I}^*_{n,y}| - 2\cos\left(\frac{\pi}{2} - \delta^*_n\right) \cdot |\Delta\dot{I}^*_1 + \Delta\dot{I}^*_2 + \ldots + \Delta\dot{I}^*_{n-1} + \Delta\dot{I}^*_{n,x}| \quad (20)$$

The second derivative of $\Delta I_\Sigma^2$ with respect to $|\Delta\dot{I}_{n,y}|$ is:

$$\frac{d^2(\Delta I_\Sigma^2)}{d(|\Delta\dot{I}_{n,y}|)^2} = 2 > 0 \quad (21)$$

When $\Delta\dot{I}^*_{n,y}$ ends near the $A_2$ side, $\Delta I_{\Sigma.max}^2$ is:

$$\Delta I_{\Sigma.max}^2 = |\Delta\dot{I}^*_1 + \Delta\dot{I}^*_2 + \ldots + \Delta\dot{I}^*_{n-1} + \Delta\dot{I}^*_n|^2 = \quad (22)$$

-continued $$|\Delta I_1^* + \Delta I_2^* + \ldots + \Delta I_{n-1}^* + \Delta I_{n,x}^* + \Delta I_{n,y}^*|^2 = |\Delta I_1^* + \Delta I_2^* + \ldots + \Delta I_{n,x}^*|^2 +$$

$$|\Delta I_{n,y}^*|^2 - 2 \cdot |\Delta I_{n,y}^*| \cdot |\Delta I_1^* + \Delta I_2^* + \ldots + \Delta I_{n,x}^*| \cos\left(\frac{3\pi}{2} - \delta_n^*\right)$$

At this moment, the derivative of $\Delta I_\Sigma^2$ with respect to $|\Delta \dot{I}_{n,y}|$ is:

$$\frac{d(\Delta I_\Sigma^2)}{d(|\Delta \dot{I}_{n,y}|)} = 2|\Delta \dot{I}_{n,y}| - 2\cos\left(\frac{3\pi}{2} - \delta_n^*\right) \cdot |\Delta I_1^* + \Delta I_2^* + \ldots + \Delta I_{n-1}^* + \Delta I_{n,x}^*| \quad (23)$$

When $\Delta \dot{I}_{n,y}^*$ ends near the $A_2$ side, the second derivative of $\Delta I_\Sigma^2$ with respect to $|\Delta \dot{I}_{n,y}|$ is the same as formula (21):

Denoting $\Delta \dot{I}_{n,y}$ ending at $A_1$ as $\Delta \dot{I}_{n,y}^{A1}$, and denoting $\Delta \dot{I}_{n,y}$ ending at $A_2$ as $\Delta \dot{I}_{n,y}^{A2}$;

Respectively denoting derivatives in formula (20) and formula (23) as $f_{n,y}^1$ and $f_{n,y}^2$.

Preferably, step S7 of solving the optimization problem of the non-convex constraint space comprises the following specific steps:

Step S701: inputting data matrixes of $\dot{I}_{1,tr}$-$\dot{I}_{n,tr}$, $\lambda_1$-$\lambda_n$ and $\alpha_1$-$\alpha_n$;

$$\begin{bmatrix} I_{1,tr} & \beta_{1,tr} & \lambda_1 & \alpha_1 \\ I_{2,tr} & \beta_{2,tr} & \lambda_2 & \alpha_2 \\ \vdots & \vdots & \vdots & \vdots \\ I_{n,tr} & \beta_{n,tr} & \lambda_n & \alpha_n \end{bmatrix} \quad (28)$$

wherein $I_{1,tr}$-$I_{n,tr}$ are amplitudes of $\dot{I}_{1,tr}$-$\dot{I}_{n,tr}$ and $\beta_{1,tr}$-$\beta_{1,tr}$ are phases of $\dot{I}_{1,tr}$-$\dot{I}_{n,tr}$;

wherein the specific values of $\lambda_1$-$\lambda_n$ and $\alpha_1$-$\alpha_n$ can be determined by the type of a current transformer and the data synchronization accuracy of a data synchronization method, and $\dot{I}_{1,tr}$-$\dot{I}_{n,tr}$ shall be fault current flowing through primary and secondary fusing intelligent switches when a fault outside the protected area is most severe;

Step S702: determining to discretize the constraint space of the optimization problem into $(4+2m)n$ points according to $\lambda_1$-$\lambda_n$ and $\alpha_1$-$\alpha_n$;

Step S703: generating a discrete point matrix;

$$\begin{bmatrix} I_{1,tr}(1-\lambda_1)\angle(\beta_{1,tr}-\alpha_1) & I_{2,tr}(1-\lambda_2)\angle(\beta_{2,tr}-\alpha_2) & \ldots & I_{n,tr}(1-\lambda_n)\angle(\beta_{n,tr}-\alpha_n) \\ I_{1,tr}(1-\lambda_1)\angle(\beta_{1,tr}+\alpha_1) & I_{2,tr}(1-\lambda_2)\angle(\beta_{2,tr}+\alpha_2) & \ldots & I_{n,tr}(1-\lambda_n)\angle(\beta_{n,tr}+\alpha_n) \\ I_{1,tr}(1+\lambda_1)\angle(\beta_{1,tr}-\alpha_1) & I_{2,tr}(1+\lambda_2)\angle(\beta_{2,tr}-\alpha_2) & \ldots & I_{n,tr}(1+\lambda_n)\angle(\beta_{n,tr}-\alpha_n) \\ I_{1,tr}(1+\lambda_1)\angle(\beta_{1,tr}+\alpha_1) & I_{2,tr}(1+\lambda_2)\angle(\beta_{2,tr}+\alpha_2) & \ldots & I_{n,tr}(1+\lambda_n)\angle(\beta_{n,tr}+\alpha_n) \\ I_{1,tr}(1+\lambda_1)\angle\left(\beta_{1,tr}-\frac{\alpha_1}{2^m}\right) & I_{2,tr}(1+\lambda_2)\angle\left(\beta_{2,tr}-\frac{\alpha_2}{2^m}\right) & \ldots & I_{n,tr}(1+\lambda_n)\angle\left(\beta_{n,tr}-\frac{\alpha_n}{2^m}\right) \\ I_{1,tr}(1+\lambda_1)\angle\left(\beta_{1,tr}-\frac{3\alpha_1}{2^m}\right) & I_{2,tr}(1+\lambda_2)\angle\left(\beta_{2,tr}-\frac{3\alpha_2}{2^m}\right) & \ldots & I_{n,tr}(1+\lambda_n)\angle\left(\beta_{n,tr}-\frac{3\alpha_n}{2^m}\right) \\ \vdots & \vdots & \ldots & \vdots \\ I_{1,tr}(1+\lambda_1)\angle\left(\beta_{1,tr}-\frac{(2k+1)\alpha_1}{2^m}\right) & I_{2,tr}(1+\lambda_2)\angle\left(\beta_{2,tr}-\frac{(2k+1)\alpha_2}{2^m}\right) & \ldots & I_{n,tr}(1+\lambda_n)\angle\left(\beta_{n,tr}-\frac{(2k+1)\alpha_n}{2^m}\right) \\ I_{1,tr}(1+\lambda_1)\angle\left(\beta_{1,tr}+\frac{\alpha_1}{2^m}\right) & I_{2,tr}(1+\lambda_2)\angle\left(\beta_{2,tr}+\frac{\alpha_2}{2^m}\right) & \ldots & I_{n,tr}(1+\lambda_n)\angle\left(\beta_{n,tr}+\frac{\alpha_n}{2^m}\right) \\ I_{1,tr}(1+\lambda_1)\angle\left(\beta_{1,tr}+\frac{3\alpha_1}{2^m}\right) & I_{2,tr}(1+\lambda_2)\angle\left(\beta_{2,tr}+\frac{3\alpha_2}{2^m}\right) & \ldots & I_{n,tr}(1+\lambda_n)\angle\left(\beta_{n,tr}+\frac{3\alpha_n}{2^m}\right) \\ \vdots & \vdots & \ldots & \vdots \\ I_{1,tr}(1+\lambda_1)\angle\left(\beta_{1,tr}+\frac{(2k+1)\alpha_1}{2^m}\right) & I_{2,tr}(1+\lambda_2)\angle\left(\beta_{2,tr}+\frac{(2k+1)\alpha_2}{2^m}\right) & \ldots & I_{n,tr}(1+\lambda_n)\angle\left(\beta_{n,tr}+\frac{(2k+1)\alpha_n}{2^m}\right) \end{bmatrix} \quad (29)$$

wherein $k \geq 1$ and $2k-1 \leq 2^m-1$

Step S704: for 1-n columns in the matrix in step S703, performing the following $(4+2^m)^n$ operations respectively for different points $x_{i1,1}, x_{i2,2}, \ldots, x_{in,n}$ of $4+2^m$ rows;

$$\Delta I_\Sigma = |x_{i1,1} + x_{i2,2} + \ldots + x_{in,n}| \quad (30)$$

wherein $1 \leq i1, i2, \ldots, i_n \leq 4+2^m$;

Step S705: searching for the maximum value in the $(4+2^m)^n$ results calculated in step S704, i.e., the approximate solution $\Delta I_{\Sigma.max}'$ of a global optimal solution, and approximately replacing $\Delta I_{\Sigma.max}$ by $\Delta I_{\Sigma.max}'$ as the protection setting value in formula (9).

Preferably, step S8 of analyzing the solution result of the optimization problem of the non-convex constraint space comprises:

Setting up a simulation model in PSCAD/EMTDC simulation software by using the system topology of a high-proportion distributed generator T-connected distribution network with a power electronic transformer as a transmission and distribution interface.

Preferably, step S8 of verifying the solution result of the optimization problem of the non-convex constraint space comprises:

Conducting contrast verification through results of sector boundary traversal and six-point, eight-point and twelve-point fast traversal methods.

Compared with the prior art, the present invention has the beneficial effects that:

The multi-terminal differential protection setting method for a distributed generator T-connected distribution network proposed by the preset invention can accurately identify internal faults and external faults of the protected area in the high-proportion distributed generator T-connected distribution network, with sufficient reliability and sensitivity, and can quickly and accurately calculate the overall maximum error of differential current of superimposed multi-terminal current phasor errors.

DETAILED DESCRIPTION

Figure 1:
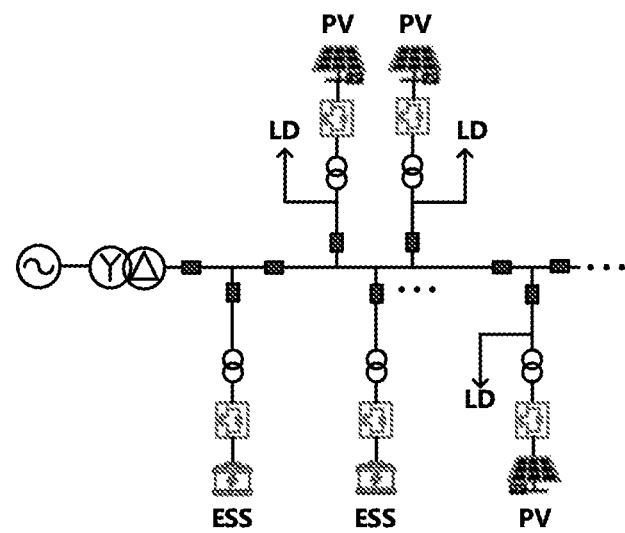
FIG. 1 is a schematic diagram of a high-proportion distributed generator T-connected distribution network of the present invention.
Figure 14:
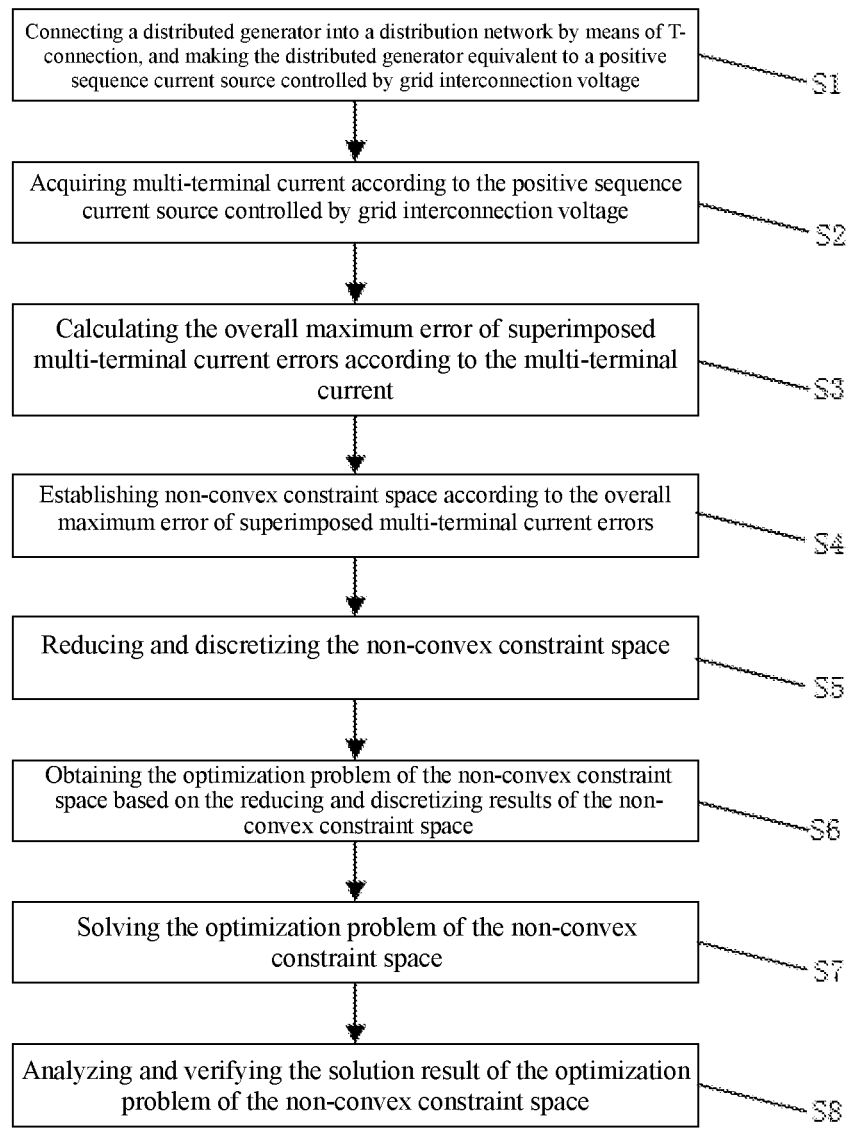
FIG. 14 is a flow chart of a multi-terminal differential protection setting method for a distributed generator T-connected distribution network of the present invention.

As shown in FIG. 14, the present invention provides a multi-terminal differential protection setting method for a distributed generator T-connected distribution network, comprising the following steps:

S1: Connecting a distributed generator into a distribution network by means of T-connection, and making the distributed generator equivalent to a positive sequence current source controlled by grid interconnection voltage;

The distribution network of a high-proportion T-connected inverter interfaced distributed generator is shown in FIG. 1. For the simplicity of analysis, only feeders to be studied are shown in FIG. 1.

ESS is an energy storage station, PV is a distributed photovoltaic power station, LD is a T-connected load, and inverter interfaced distributed generators such as photovoltaic type and energy storage type are connected into the distribution network by means of T-connection.

An inverter interfaced distributed generator can be made equivalent to a positive sequence current source controlled by grid interconnection voltage under the low voltage ride-through control strategy and the negative sequence current suppression control strategy.

Further, in step S1, an equivalent model for making the distributed generator equivalent to a positive sequence current source controlled by grid interconnection voltage is:

$$U^*_{pcc(1)} = U_{pcc(1)}/U_{pcc(1).N} \quad (1)$$

$$I_{DGm.N} = \sqrt{2}P_{ref.N}/3U_{pcc(1).N}$$

$$i_{q(1)} = \begin{cases} 0, & U^*_{pcc(1)} > 0.9 \\ -2(1-U^*_{pcc(1)})I_{DGm.N}, & 0.4 \leq U^*_{pcc(1)} \leq 0.9 \\ -1.2I_{DGm.N}, & U^*_{pcc(1)} < 0.4 \end{cases}$$

$$i_{d(1)} = \min\left(\frac{\sqrt{2}P_{ref}}{3U_{pcc(1)}}, \sqrt{(1.2I_{DGm.N})^2 - i^2_{q(1)}}\right)$$

$$\dot{I}_{DG} = \begin{cases} \frac{\sqrt{i^2_{d(1)}+i^2_{q(1)}}}{\sqrt{2}}\angle\left(\arctan\frac{i_{q(1)}}{i_{d(1)}}+\varphi\right), & i_{d(1)} \neq 0 \\ \frac{\sqrt{i^2_{d(1)}+i^2_{q(1)}}}{\sqrt{2}}\angle(-90°+\varphi), & i_{d(1)} = 0 \end{cases}$$

wherein $U_{pcc(1)}$ is an effective value of grid interconnection positive sequence phase voltage, $U_{pcc(1).N}$ is an effective value of grid interconnection positive sequence phase voltage in the rated running state, $I_{DGm.N}$ is an amplitude of rated current, $P_{ref.N}$ is a rated active reference value, $P_{ref}$ is an active reference value before failure, $\dot{I}_{DG}$ is output current, $i_{d(1)}$ and $i_{q(1)}$ are a d-axis component and a q-axis component of the positive sequence component of the output current, and $\varphi$ is the phase of $\dot{U}_{pcc(1)}$.

It can be seen from formula (1) that the output current of the inverter interfaced distributed generator has the characteristics of limited amplitude and controlled phase. Under the action of a current limiting link, the amplitude of $\dot{I}_{DG}$ will not exceed 1.2 times the rated value, either in normal operation or during system failure. Therefore, an inverter interfaced distributed generator connected into the distribution network by high-proportion T-connection has typical weak feed characteristics.

Figure 2:
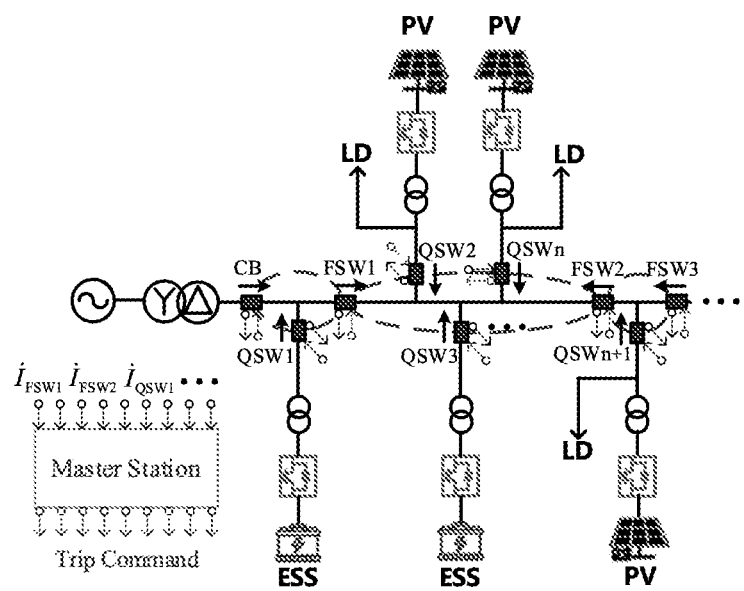
FIG. 2 is a schematic diagram of a configuration scheme of centralized multi-terminal current differential protection of the present invention.

S2: Acquiring multi-terminal current according to the positive sequence current source controlled by grid interconnection voltage;

S3: Calculating the overall maximum error of superimposed multi-terminal current errors according to the multi-terminal current;

Aiming at the configuration scheme and action criterion of multi-terminal current differential protection of a high-proportion distributed generator T-connected distribution network, the present invention adopts the configuration scheme of centralized multi-terminal differential protection, as shown in FIG. 2.

CB is a feeder outgoing circuit breaker, FSW1 to FSW3 are sectional switches on main feeders, and QSW1 to QSWn+1 are branch switches on T-connected lines, which are primary and secondary fusion intelligent switches. The protection system is composed of a master station, a plurality of primary and secondary fusion switches and a communication network. In order to ensure reliability, the network is generally constructed through optical fiber. After being synchronized with the data of the master station, the primary and secondary fusion switches complete data acquisition and upload electrical data to the master station, the master station completes the calculation of differential protection, decides whether each switch needs to trip, and then sends the trip signal to the primary and secondary fusion switches that need to trip, and the primary and secondary fusion switches act to clear the fault after receiving the trip signal.

Further, step S3 of calculating the overall maximum error of superimposed multi-terminal current errors according to the multi-terminal current comprises:

Expressing the power frequency current phasor involved in a group of n(n≥3)-terminal current differential protection by a set P:

$$P=\{İ_1, İ_2, \ldots, İ_n\} \quad (2)$$

The action criterion of the multi-terminal current differential protection is:

$$I_{op} \geq I_{set} \quad (3)$$

wherein $I_{op}$ is differential current; and $I_{set}$ is a protection setting value;

Expressing the relationship between the measured value and the actual value of each power frequency current phasor as follows:

$$İ_{i.ms} = İ_{i.tr} + \Delta İ_i \quad (4)$$

i=1, 2, . . . , n wherein $İ_{i.ms}$ represents the measured value of the power frequency current phasor, $İ_{i.tr}$ represents the actual value of the power frequency current phasor, and $\Delta İ_i$ represents the error between the actual value and the measured value;

At this moment, the differential current is:

$$I_{op} = |İ_{1.ms} + İ_{2.ms} + \ldots + İ_{n.ms}|$$
$$= |İ_{1.tr} + \Delta İ_1 + İ_{2.tr} + \Delta İ_2 + \ldots + İ_{n.tr} + \Delta İ_n| \quad (5)$$

According to the Kirchhoff's Current Law, meeting the formula below during normal operation and during failure outside a protected area:

$$İ_{1.tr} + İ_{2.tr} + \ldots + İ_{n.tr} = 0 \quad (6)$$

According to formula (5) and formula (6), the differential current during normal operation and during failure outside a protected area is:

$$I_{op} = |\Delta İ_1 + \Delta İ_2 + \ldots + \Delta İ_n| \quad (7)$$

Denoting the overall maximum error of superimposed multi-terminal current errors as $\Delta I_\Sigma$:

$$\Delta I_\Sigma = |\Delta İ_1 + \Delta İ_2 + \ldots + \Delta İ_n| \quad (8)$$

A protection setting value shall be selected to ensure that no maloperation of faults exist outside the protected area, and no refused operation of faults exist inside the protected area, which have a certain degree of distinction. Therefore, the protection setting value can be:

$$I_{set} = k_{rel} \Delta I_{\Sigma.max} \quad (9)$$

wherein $k_{rel}$ is a reliability coefficient, generally 1.1-1.3; and $\Delta I_{\Sigma.max}$ is the overall maximum error of superimposed multi-terminal current errors.

The overall maximum error $\Delta I_{\Sigma.max}$ of superimposed multi-terminal errors is related to multi-terminal current, and the specific acquisition method will be described in detail below.

Figure 3:
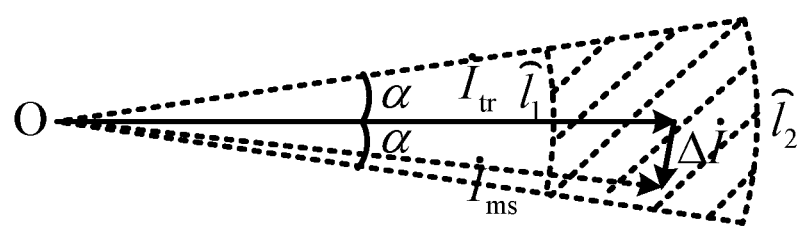
FIG. 3 is a schematic diagram of the relationship between the measured value and the actual value of current of the present invention.

The overall maximum error of differential current of superposed n-terminal current errors is analyzed as follows: assuming that under the influence of the measurement error and the data synchronization error, a power frequency current phasor has a maximum amplitude error of λ and a maximum phase error of α, the specific values are determined by the type of a current transformer and the data synchronization accuracy of a data synchronization method. In the case of errors, the relationship between $İ_{ms}$ and $İ_{tr}$ is shown in FIG. 3.

wherein a solid line with an arrow represents an actual value, and a dotted line with an arrow represents a measured value. An arc $Î_1$ is symmetric about a straight line where $İ_{tr}$ is located, with the head end O of $İ_{tr}$ as the center of a circle, with $(1-\lambda)I_{tr}$ as the radius and with 2α as the centering angle. An arc $Î_2$ is symmetric about a straight line where in is located, with O as the center of a circle, with $(1+\lambda)I_{tr}$ as the radius and with 2α as the centering angle. A sector shadow area formed by $Î_1$ and $Î_2$ is a set of possible measured values.

The relationship between a measured value and an actual value can be described by the formula below:

$$1 - \lambda \leq \frac{I_{ms}}{I_{tr}} \leq 1 + \lambda \quad (10)$$

$$-\alpha \leq \text{angle}(İ_{ms}) - \text{angle}(İ_{tr}) \leq \alpha$$

Figure 4:
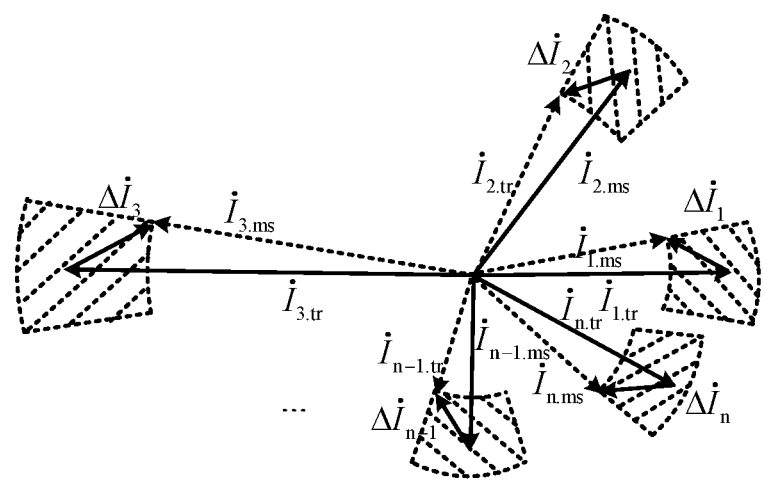
FIG. 4 is a schematic diagram of the measured value and the actual value of n-terminal current of the present invention.

In the case of errors in n-terminal current phasors, as shown in FIG. 4:

Assuming that when $\Delta İ_1 = \Delta İ^*_1$, $\Delta İ_2 = \Delta İ^*_2$, ..., $\Delta İ_{n-1} = \Delta İ^*_{n-1}$, $\Delta İ_n = \Delta İ^*_n$, the overall error $\Delta I_\Sigma$ reaches the maximum value $\Delta I_{\Sigma.max}$, that is:

$$\Delta I_{\Sigma.max} = |\Delta I^*_1 + \Delta I^*_2 + \ldots + \Delta I^*_{n-1} + \Delta I^*_n| \quad (11)$$

Obviously, solving $\Delta I^*_1, \Delta I^*_2, \ldots, \Delta I^*_{n-1}, \Delta I^*_n$, and the overall maximum error $\Delta I_{\Sigma.max}$ is an optimization problem, and the objective function is:

$$\Delta I_{\Sigma.max} = \max(|\Delta İ_1 + \Delta İ_2 + \ldots + \Delta İ_{n-1} + \Delta İ_n|) \quad (12)$$

The constraints of the optimization problem include:

$$1 - \lambda_i \leq \frac{|İ_{i.tr} + \Delta İ_i|}{I_{i.tr}} \leq 1 + \lambda_i \quad (13)$$

$$-\alpha_i \leq \text{angle}(İ_{i.tr} + \Delta İ_i) - \text{angle}(İ_{i.tr}) \leq \alpha_i$$

$$i = 1, 2, \ldots, n-1, n.$$

It can be seen that the objective function of the optimization problem can be transformed into a quadratic function, but the inequality constraints of the optimization problem contain a large number of nonlinear functions, which is different from a general quadratic programming problem. Therefore, it is difficult to solve the optimization problem effectively by using conventional quadratic programming methods such as Lagrange method, Lemke method and interior point method.

Generally speaking, an iterative method shall be adopted to find the extreme values of a complex function under complex constraints. However, the inequality constraints of the optimization problem are corresponding to the sector shadow area in FIG. 4, which is obviously non-convex space, so iterative algorithms applicable to convex constraint space, such as gradient descent method, steepest descent method and Newton method, are also difficult to play a role in the optimization problem.

For the optimization problem on the non-convex constraint space, a feasible method is to discretize the non-convex constraint space first, and then to solve the discretized constraint space. In order to minimize the existence range of the optimal solution of the non-convex constraint space, two characteristics of the non-convex space are analyzed below.

S4: Establishing non-convex constraint space according to the overall maximum error of superimposed multi-terminal current errors;

Further, step S4 of establishing non-convex constraint space according to the overall maximum error of superimposed multi-terminal current errors comprises: two characteristics of the non-convex constraint space;

First characteristic: the phasors of $\Delta\dot{I}^*_1, \Delta\dot{I}^*_2, \ldots, \Delta\dot{I}^*_{n-1}, \Delta\dot{I}^*_n$ end on the boundaries of the respective sector shadow area.

Figure 5:
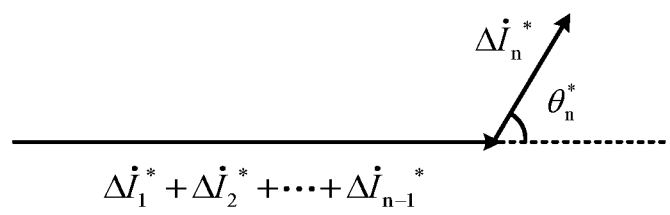
FIG. 5 is a schematic diagram of the position relationship between $\Delta\dot{I}^*_1+\Delta\dot{I}^*_2+\ldots+\Delta\dot{I}_{n-1}$ and $\Delta\dot{I}^*_n$ in a complex plane of the present invention.

With $\Delta\dot{I}^*_n$ as an example, assuming that position relationship between $\Delta\dot{I}^*_1 + \Delta\dot{I}^*_2 + \ldots + \Delta\dot{I}^*_{n-1}$ and $\Delta\dot{I}^*_n$ in a complex plane is show in FIG. 5.

wherein $\theta^*_n$ is the phase difference between phasors $\Delta\dot{I}^*_1 + \Delta\dot{I}^*_2 + \ldots + \Delta\dot{I}^*_{n-1}$ and $\Delta\dot{I}^*_n$, and $\theta^*_n \in [0, 2\pi)$.

According to the Law of Cosines, $\Delta I_{\Sigma,max}^2$ is:

$$\Delta I_{\Sigma,max}^2 = \qquad (14)$$
$$\left|\Delta\dot{I}^*_1 + \Delta\dot{I}^*_2 + \ldots + \Delta\dot{I}^*_{n-1} + \Delta\dot{I}^*_n\right|^2 = \left|\Delta\dot{I}^*_1 + \Delta\dot{I}^*_2 + \ldots + \Delta\dot{I}^*_{n-1}\right|^2 +$$
$$\left|\Delta\dot{I}^*_n\right|^2 - 2 \cdot \left|\Delta\dot{I}^*_n\right| \cdot \left|\Delta\dot{I}^*_1 + \Delta\dot{I}^*_2 + \ldots + \Delta\dot{I}^*_{n-1}\right| \cos(\pi - \theta^*_n)$$

Denoting $\Delta\dot{I}_n$ a having the phase difference of $\theta^*_n$ from $\Delta\dot{I}^*_1 + \Delta\dot{I}^*_2 + \ldots + \Delta\dot{I}^*_{n-1}$ as $\Delta\dot{I}_n^{\theta_n^*}$, and denoting $\Delta\dot{I}_n^{\theta_n^*}$ ending on the boundaries of the shadow area as $\Delta\dot{I}_n^{\theta_n^*,max}$.

Since $\Delta\dot{I}^*_1, \Delta\dot{I}^*_2, \ldots, \Delta\dot{I}^*_{n-1}, \Delta\dot{I}_n^{\theta_n^*}$ are independent of each other, the derivative of $\Delta I_\Sigma^2$ with respect to $|\Delta\dot{I}_n^{\theta_n^*}|$ is:

$$\frac{d(\Delta I_\Sigma^2)}{d(|\Delta\dot{I}_n^{\theta_n^*}|)} = 2\left|\Delta\dot{I}_n^{\theta_n^*}\right| - 2 \cdot \cos(\pi - \theta^*_n) \cdot \left|\Delta\dot{I}^*_1 + \Delta\dot{I}^*_2 + \ldots + \Delta\dot{I}^*_{n-1}\right| \qquad (15)$$

The second derivative of $\Delta I_\Sigma^2$ with respect to $|\Delta\dot{I}_n^{\theta_n^*}|$ is:

$$\frac{d^2(\Delta I_\Sigma^2)}{d(|\Delta\dot{I}_n^{\theta_n^*}|)^2} = 2 > 0 \qquad (16)$$

According to formula (14) to formula (16), since the quadratic term coefficients of the second derivative and the first derivative are both larger than 0, as $|\Delta\dot{I}_n^{\theta_n^*}|$ changes from 0 to $|\Delta\dot{I}_n^{\theta_n^*,max}|$, $\Delta I_\Sigma$ has at most one extreme point which is a minimum point. Therefore, $\Delta I_\Sigma$ is maximum only when $\Delta\dot{I}_n^{\theta_n^*}=0$ or $\Delta\dot{I}_n^{\theta_n^*}=\Delta\dot{I}_n^{\theta_n^*,max}$.

Since $\Delta\dot{I}_n$ which has the same direction as $\Delta\dot{I}^*_1 + \Delta\dot{I}^*_2 + \ldots + \Delta\dot{I}^*_{n-1}$ and whose amplitude is not zero can always be found, at least one $\Delta\dot{I}_n^\xi$ inevitably exists in the sector shadow area so that:

$$|\Delta\dot{I}^*_1 + \Delta\dot{I}^*_2 + \ldots + \Delta\dot{I}^*_{n-1} + \Delta\dot{I}_n^\xi| > |\Delta\dot{I}^*_1 + \Delta\dot{I}^*_2 + \ldots + \Delta\dot{I}^*_{n-1} + 0| \qquad (17)$$

Therefore, $\Delta\dot{I}^*_n$ n at the overall maximum error will not be 0, and thus can only be $\Delta\dot{I}^*_n = \Delta\dot{I}_n^{\theta_n^*,max}$.

In conclusion, when the overall error is maximum, the phasor of $\Delta\dot{I}^*_n$ must end on the boundaries of the sector shadow area. Obviously, when $\Delta\dot{I}^*_1 - \Delta\dot{I}^*_{n-1}$ are analyzed respectively, the same conclusion as $\Delta\dot{I}^*_n$ also can be made. Therefore, when the overall error is maximum, the phasors of $\Delta\dot{I}^*_1 - \Delta\dot{I}^*_n$ end on the boundaries of the sector shadow area.

Second characteristic: the phasors of $\Delta\dot{I}^*_1, \Delta\dot{I}^*_2, \ldots, \Delta\dot{I}^*_{n-1}, \Delta\dot{I}^*_n$ must be on both ends of the straight boundaries if ending on the straight boundaries of the sector shadow area.

With $\Delta\dot{I}^*_n$ as an example, the second characteristic will be proved below.

Figure 6:
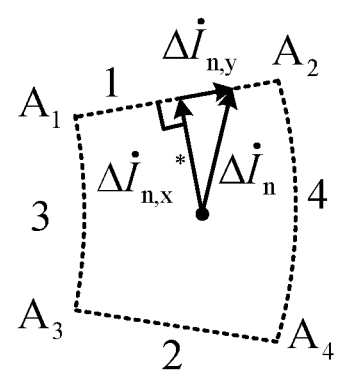
FIG. 6 is a schematic diagram of numbering four boundaries of a sector shadow area corresponding to $\Delta\dot{I}_n$ of the present invention.

Numbering four boundaries of the sector shadow area corresponding to $\Delta\dot{I}_n$, as shown in FIG. 6.

In the figure, the boundaries 1 and 2 are straight boundaries, and the boundaries 3 and 4 are arc boundaries, wherein $\Delta\dot{I}_n$ ending on the boundary 1 can be decomposed into:

$$\Delta\dot{I}_n = \Delta\dot{I}^*_{n,x} + \Delta\dot{I}_{n,y} \qquad (18)$$

wherein $\Delta\dot{I}^*_{n,x}$ is the projection of $\Delta\dot{I}_n$ on the vertical line of the boundary 1, and $\Delta\dot{I}_{n,y}$ is the projection of $\Delta\dot{I}_n$ on the boundary 1.

When $\Delta\dot{I}^*_{n,y}$ ends near the $A_1$ side, $\Delta I_{\Sigma,max}^2$ is:

$$\Delta I_{\Sigma,max}^2 = \left|\Delta\dot{I}^*_1 + \Delta\dot{I}^*_2 + \ldots + \Delta\dot{I}^*_{n-1} + \Delta\dot{I}^*_n\right|^2 = \qquad (19)$$
$$\left|\Delta\dot{I}^*_1 + \Delta\dot{I}^*_2 + \ldots + \Delta\dot{I}^*_{n-1} + \Delta\dot{I}^*_{n,x} + \Delta\dot{I}^*_{n,y}\right|^2 = \left|\Delta\dot{I}^*_1 + \Delta\dot{I}^*_2 + \ldots + \Delta\dot{I}^*_{n,x}\right|^2 +$$
$$\left|\Delta\dot{I}^*_{n,y}\right|^2 - 2 \cdot \left|\Delta\dot{I}^*_{n,y}\right| \cdot \left|\Delta\dot{I}^*_1 + \Delta\dot{I}^*_2 + \ldots + \Delta\dot{I}^*_{n,x}\right| \cos\left(\frac{\pi}{2} - \delta^*_n\right)$$

wherein $\delta^*_n$ is the phase difference between $\Delta\dot{I}^*_1 + \Delta\dot{I}^*_2 + \ldots + \Delta\dot{I}^*_{n-1}$ and $\Delta\dot{I}^*_{n,x}$, and $\delta^*_n \in [0, 2\pi)$.

Since $\Delta\dot{I}^*_1, \Delta\dot{I}^*_2, \ldots, \Delta\dot{I}^*_{n-1}, \Delta\dot{I}^*_{n,x} \Delta\dot{I}_{n,y}$ are independent of each other, the derivative of $\Delta I_\Sigma^2$ with respect to $|\Delta\dot{I}_{n,y}|$ is:

$$\frac{d(\Delta I_\Sigma^2)}{d(|\Delta\dot{I}_{n,y}|)} = 2|\Delta\dot{I}_{n,y}| - 2\cos\left(\frac{\pi}{2} - \delta^*_n\right) \cdot \left|\Delta\dot{I}^*_1 + \Delta\dot{I}^*_2 + \ldots + \Delta\dot{I}^*_{n-1} + \Delta\dot{I}^*_{n,x}\right| \qquad (20)$$

The second derivative of $\Delta I_\Sigma^2$ with respect to $|\Delta\dot{I}_{n,y}|$ is:

$$\frac{d^2(\Delta I_\Sigma^2)}{d(|\Delta\dot{I}_{n,y}|)^2} = 2 > 0 \qquad (21)$$

When $\Delta\dot{I}^*_{n,y}$ ends near the $A_2$ side, $\Delta I_{\Sigma,max}^2$ is:

$$\Delta I_{\Sigma,max}^2 = \left|\Delta\dot{I}^*_1 + \Delta\dot{I}^*_2 + \ldots + \Delta\dot{I}^*_{n-1} + \Delta\dot{I}^*_n\right|^2 = \qquad (22)$$
$$\left|\Delta\dot{I}^*_1 + \Delta\dot{I}^*_2 + \ldots + \Delta\dot{I}^*_{n-1} + \Delta\dot{I}^*_{n,x} + \Delta\dot{I}^*_{n,y}\right|^2 = \left|\Delta\dot{I}^*_1 + \Delta\dot{I}^*_2 + \ldots + \Delta\dot{I}^*_{n,x}\right|^2 +$$
$$\left|\Delta\dot{I}^*_{n,y}\right|^2 - 2 \cdot \left|\Delta\dot{I}^*_{n,y}\right| \cdot \left|\Delta\dot{I}^*_1 + \Delta\dot{I}^*_2 + \ldots + \Delta\dot{I}^*_{n,x}\right| \cos\left(\frac{3\pi}{2} - \delta^*_n\right)$$

At this moment, the derivative of $\Delta I_\Sigma^2$ with respect to $|\Delta\dot{I}_{n,y}|$ is:

$$\frac{d(\Delta I_\Sigma^2)}{d(|\Delta\dot{I}_{n,y}|)} = 2|\Delta\dot{I}_{n,y}| - 2\cos\left(\frac{3\pi}{2} - \delta^*_n\right) \cdot \left|\Delta\dot{I}^*_1 + \Delta\dot{I}^*_2 + \ldots + \Delta\dot{I}^*_{n-1} + \Delta\dot{I}^*_{n,x}\right| \qquad (23)$$

When $\Delta\dot{I}^*_{n,y}$ ends near the $A_2$ side, the second derivative of $\Delta I_\Sigma^2$ with respect to $|\Delta\dot{I}_{n,y}|$ is the same as formula (21).

Denoting $\Delta\dot{I}_{n,y}$ ending at $A_1$ as $\Delta\dot{I}_{n,y}^{A1}$, and denoting $\Delta\dot{I}_{n,y}$ ending at $A_2$ as $\Delta\dot{I}_{n,y}^{A2}$.

Respectively denoting derivatives in formula (20) and formula (23) as $f_{n,y}^1$ and $f_{n,y}^2$.

According to formula (19) to formula (23), since the quadratic term coefficients of the second derivative and the first derivative are both larger than 0, as $|\Delta \dot{I}_{n,y}|$, changes from 0 to $|\Delta \dot{I}_{n,y}^{A1}|$, $\Delta I_\Sigma$ has at most one extreme point which is a minimum point. As $|\Delta \dot{I}_{n,y}|$ changes from 0 to $|\Delta \dot{I}_{n,y}^{A2}|$, $\Delta I_\Sigma$ also has at most one extreme point which is also a minimum point. Therefore, $\Delta I_\Sigma$ is maximum only when $\Delta \dot{I}_{n,y}=0$, $\Delta \dot{I}_{n,y}=\Delta \dot{I}_{n,y}^{A1}$ or $\Delta \dot{I}_{n,y}=\Delta \dot{I}_{n,y}^{A2}$.

However, the formula below must be true regardless of the value of $\delta^*_n$:

$$\cos\left(\frac{3\pi}{2} - \delta_n^*\right) \cdot \cos\left(\frac{\pi}{2} - \delta_n^*\right) \leq 0 \quad (24)$$

Therefore, at least one of $f_{n,y}^1$ and $f_{n,y}^2$ is larger than or equal to 0 regardless of the value of $|\Delta \dot{I}_{n,y}|$, that is, the formula below is true.

$$f_{n,y}^1 = 2|\Delta \dot{I}_{n,y}| - 2\cos\left(\frac{\pi}{2} - \delta_n^*\right) \cdot |\Delta \dot{I}_1^* + \Delta \dot{I}_2^* + \ldots + \Delta \dot{I}_{n-1}^* + \Delta \dot{I}_{n,x}^*| \geq 0 \text{ or} \quad (25)$$

$$f_{n,y}^2 = 2|\Delta \dot{I}_{n,y}| - 2\cos\left(\frac{3\pi}{2} - \delta_n^*\right) \cdot |\Delta \dot{I}_1^* + \Delta \dot{I}_2^* + \ldots + \Delta \dot{I}_{n-1}^* + \Delta \dot{I}_{n,x}^*| \geq 0$$

Therefore, when $\Delta \dot{I}_{n,y}=\Delta \dot{I}_{n,y}^{A1}$ or $\Delta \dot{I}_{n,y}=\Delta \dot{I}_{n,y}^{A2}$, the value of $\Delta I_\Sigma$ is larger than the value of $\Delta I_\Sigma$ when $\Delta \dot{I}_{n,y}=0$. That is, when the overall error is maximum, the phasor of $\Delta \dot{I}^*_n$ must be on both ends of the straight boundaries if ending on the straight boundaries of the sector shadow area.

Obviously, when $\Delta \dot{I}^*_1$-$\Delta \dot{I}^*_{n-1}$ are analyzed respectively, the same conclusion as $\Delta \dot{I}^*_n$ also can be made. Therefore, the phasors of $\Delta \dot{I}^*_1$, $\Delta \dot{I}^*_2$, ..., $\Delta \dot{I}^*_{n-1}$, $\Delta \dot{I}^*_n$ must be on both ends of the straight boundaries if ending on the straight boundaries of the sector shadow area.

Figure 7:
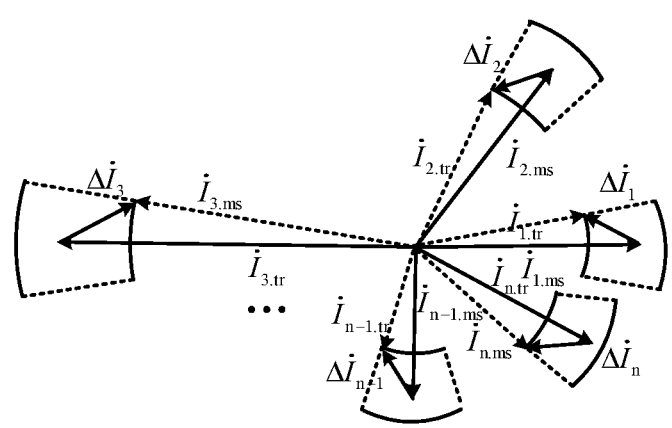
FIG. 7 is a schematic diagram of reducing non-convex constraint space of an optimization problem from n sector shadow areas to 2n arcs in the present invention.

S5: Reducing and discretizing the non-convex constraint space;

S6: Obtaining the optimization problem of the non-convex constraint space based on the reducing and discretizing results of the non-convex constraint space;

According to the two characteristics, the non-convex constraint space of the optimization problem can be reduced from n sector shadow areas to 2n arcs, as shown in FIG. 7.

At this moment, the range of the optimal solution is still a little big, and further simplification is needed for the two arcs of the sector.

Figure 8:
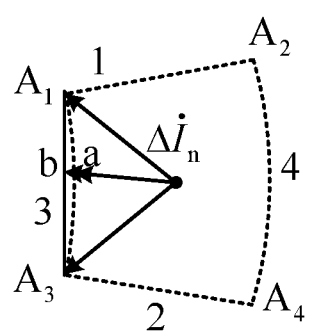
FIG. 8 is a schematic diagram of analysis of an internal arc of a sector passing through a connecting line $A_1A_3$ in the present invention.

With $\Delta \dot{I}^*_n$ as an example, the internal arc of the sector, i.e., the boundary 3, can be analyzed through the connecting line $A_1A_3$, as shown in FIG. 8.

In the figure, a is any point on the boundary 3, and $\Delta \dot{I}_n$ ending at a is extended to ;n,ersect with the line $A_1A_3$ at b.

According to the first characteristic, since any point on the line $A_1A_3$ is outside the sector area, the overall error $\Delta I_\Sigma$ when $\Delta \dot{I}_n$ ends at b is larger than that when $\Delta \dot{I}_n$ ends at a. According to the second characteristic, it can be concluded that the overall error $\Delta I_\Sigma$ when $\Delta \dot{I}_n$ ends at $A_1$ or $A_3$ is larger than that when n ends at b.

Figure 9:
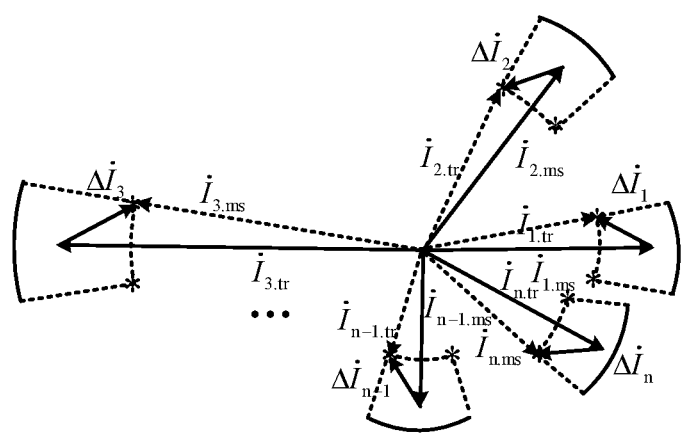
FIG. 9 is a schematic diagram of reducing constraint space of an optimization problem from 2n arcs of a sector to n arcs and 2n points in the present invention.

Therefore, the constraint space of the optimization problem can be reduced from 2n arcs of the sector to n arcs and 2n points, as shown in FIG. 9.

Figure 10:
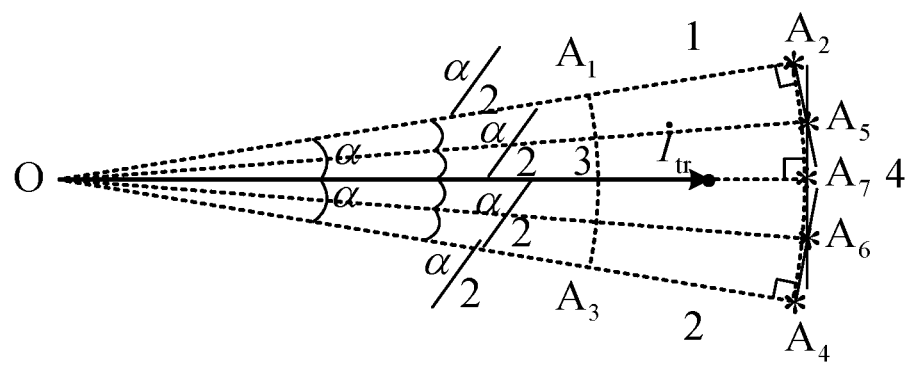
FIG. 10 is a schematic diagram of drawing a tangent line of an arc through points $A_2$ and $A_4$ and the arc top by discretization of a boundary 4 using two characteristics in the present invention.

For the external arc of the sector, i.e., the boundary 4, since any point on the line $A_2A_4$ is inside the sector area, the boundary 4 cannot be simply reduced to two endpoints of the arc according to the two characteristics. To discretize the boundary 4 using the two characteristics, a tangent line of the arc can be drawn respectively through points $A_2$ and $A_4$ and the arc top, as shown in FIG. 10.

In the figure, a tangent line through the point $A_2$ and a tangent line through the arc top $A_7$ intersect at $A_5$, and a tangent line through the point $A_4$ and a tangent line through the arc top $A_7$ intersect at $A_6$. It is not difficult to show that both $OA_5$ and $OA_6$ are angular bisectors of an angle $\alpha$.

Obviously, any point on the line $A_2A_5$, the line $A_5A_6$ and the line $A_4A_6$ is outside the sector area, so the boundary 4 can be discretized into four points $A_2$, $A_5$, $A_6$ and $A_4$ according to the two characteristics.

Figure 11:
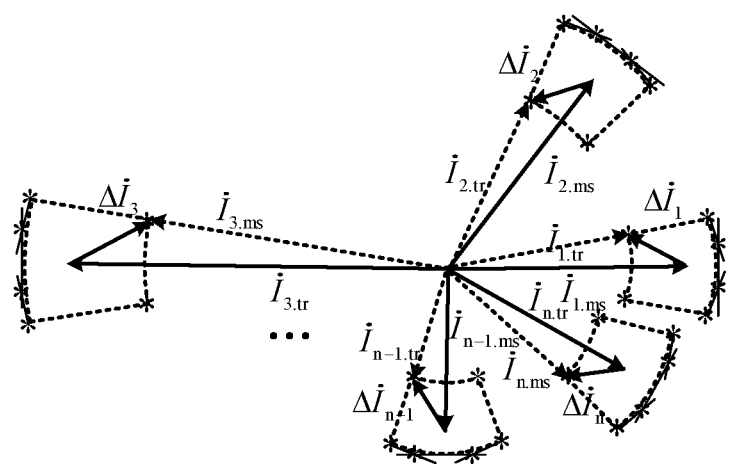
FIG. 11 is a schematic diagram of further reducing constraint space of an optimization problem from n arcs and 2n points to 6n points in the present invention.

Therefore, the constraint space of the optimization problem can be further reduced from n arcs and 2n points to 6n points, as shown in FIG. 11.

However, as a result, the range of the constraint space is expanded, the solution obtained is only the approximate solution $\Delta I_{\Sigma.max}'$ of the global optimal solution, but not a true global optimal solution $\Delta I_{\Sigma.max}$, and the value of $\Delta I_{\Sigma.max}'$ may be larger than $\Delta I_{\Sigma.max}$. The difference between $\Delta I_{\Sigma.max}'$ and $\Delta I_{\Sigma.max}$ is closely related to the distance from points on the line $A_2A_5$, the line $A_5A_6$ and the line $A_4A_6$ to the arc. In FIG. 10, the farthest points from the arc are $A_5$ and $A_6$, and with $I_{tr}$ as the reference value, the per unit distance from the points $A_5$ and $A_6$ to the arc is:

$$d = (1+\lambda)\left(\frac{1}{\cos(\alpha/2)} - 1\right) \quad (26)$$

Figure 12:
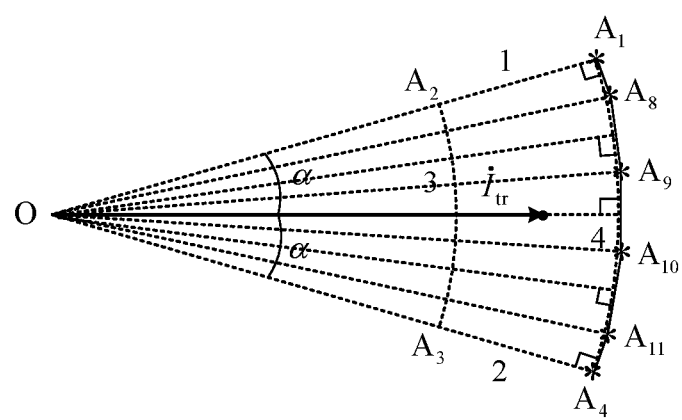
FIG. 12 is a schematic diagram of drawing a tangent line of an arc through intersection points of $OA_5$ and $OA_6$ and the arc based on FIG. 11 in the present invention.

It can be seen that the smaller $\lambda$ and $\alpha$ are, the smaller d is. For example, when $\lambda=0.1$ and $\alpha=5°$, d=0.001047, the value is small, then $\Delta I_{\Sigma.max}'$ and $\Delta I_{\Sigma.max}$ are almost the same, the difference therebetween is within an acceptable range. However, as $\lambda$ and $\alpha$ become larger, the difference between $\Delta I_{\Sigma.max}'$ and $\Delta I_{\Sigma.max}$ will become larger. To solve the problem, a tangent line of the arc can be drawn respectively through intersection points of $OA_5$ and $OA_6$ and the arc based on FIG. 11, as shown in FIG. 12.

In the figure, $A_8$, $A_9$, $A_{10}$ and $A_{11}$ are intersection points of new tangent lines.

At this moment, the farthest points from the arc are $A_8$ to $A_{11}$, and with $I_{tr}$ as the reference value, the per unit distance is:

$$d = (1+\lambda)\left(\frac{1}{\cos(\alpha/4)} - 1\right) \quad (27)$$

Compared with formula (26), the distance d decreases, and the distance between $\Delta I_{\Sigma.max}'$ and $\Delta I_{\Sigma.max}$ will also decrease. As $\lambda$ and $\alpha$ become larger, a similar method can be adopted to continuously draw tangents to select intersection points of the tangent lines, the arc is replaced by multiple tangent lines, i.e., the curved line is replaced by straight lines, and then the boundary 4 can be discretized into intersection points of tangent lines by the two characteristics. As a result, the constraint space of the optimization problem can be discretized into 6n, 8n, 12n, 20n, . . . , (4+2m)n points, wherein m≥1. The more the points are, the closer the approximate solution of the global optimal solution is to the true global optimal solution. However, no matter how many points are discretized, the approximate solution of the global optimal solution will always be slightly larger than the true global optimal solution. Therefore, even if the true global optimal solution cannot be obtained, the approximate solution of the global optimal solution can meet the need of protection setting.

S7: Solving the optimization problem of the non-convex constraint space;

Further, step S7 of solving the optimization problem of the non-convex constraint space comprises the following specific steps:

Step S701: inputting data matrixes of $\dot{I}_{1.tr}$-$\dot{I}_{n.tr}$, $\lambda_1$-$\lambda_n$ and $\alpha_1$-$\alpha_n$;

$$\begin{bmatrix} I_{1,tr} & \beta_{1,tr} & \lambda_1 & \alpha_1 \\ I_{2,tr} & \beta_{2,tr} & \lambda_2 & \alpha_2 \\ \vdots & \vdots & \vdots & \vdots \\ I_{n,tr} & \beta_{n,tr} & \lambda_n & \alpha_n \end{bmatrix} \quad (28)$$

wherein $I_{1.tr}$-$I_{n.tr}$ are amplitudes of $\dot{I}_{1.tr}$-$\dot{I}_{n.tr}$, and $\beta_{1.tr}$-$\beta_{1.tr}$ are phases of $\dot{I}_{1.tr}$-$\dot{I}_{n.tr}$;

wherein the specific values of $\lambda_1$-$\lambda_n$ and $\alpha_1$-$\alpha_n$ can be determined by the type of a current transformer and the data synchronization accuracy of a data synchronization method, and $\dot{I}_{1.tr}$-$\dot{I}_{n.tr}$ shall be fault current flowing through primary and secondary fusing intelligent switches when a fault outside the protected area is most severe;

Step S702: determining to discretize the constraint space of the optimization problem into (4+2m)n points according to $\lambda_1$-$\lambda_n$ and $\alpha_1$-$\alpha_n$;

Step S703: generating a discrete point matrix;

$$\begin{bmatrix} I_{1,tr}(1-\lambda_1)L(\beta_{1,tr}-\alpha_1) & I_{2,tr}(1-\lambda_2)L(\beta_{2,tr}-\alpha_2) & \ldots & I_{n,tr}(1-\lambda_n)L(\beta_{n,tr}-\alpha_n) \\ I_{1,tr}(1-\lambda_1)L(\beta_{1,tr}+\alpha_1) & I_{2,tr}(1-\lambda_2)L(\beta_{2,tr}+\alpha_2) & \ldots & I_{n,tr}(1-\lambda_n)L(\beta_{n,tr}+\alpha_n) \\ I_{1,tr}(1+\lambda_1)L(\beta_{1,tr}-\alpha_1) & I_{2,tr}(1+\lambda_2)L(\beta_{2,tr}-\alpha_2) & \ldots & I_{n,tr}(1+\lambda_n)L(\beta_{n,tr}-\alpha_n) \\ I_{1,tr}(1+\lambda_1)L(\beta_{1,tr}+\alpha_1) & I_{2,tr}(1+\lambda_2)L(\beta_{2,tr}+\alpha_2) & \ldots & I_{n,tr}(1+\lambda_n)L(\beta_{n,tr}+\alpha_n) \\ I_{1,tr}(1+\lambda_1)L\left(\beta_{1,tr}-\frac{\alpha_1}{2^m}\right) & I_{2,tr}(1+\lambda_2)L\left(\beta_{2,tr}-\frac{\alpha_2}{2^m}\right) & \ldots & I_{n,tr}(1+\lambda_n)L\left(\beta_{n,tr}-\frac{\alpha_n}{2^m}\right) \\ I_{1,tr}(1+\lambda_1)L\left(\beta_{1,tr}-\frac{3\alpha_1}{2^m}\right) & I_{2,tr}(1+\lambda_2)L\left(\beta_{2,tr}-\frac{3\alpha_2}{2^m}\right) & \ldots & I_{n,tr}(1+\lambda_n)L\left(\beta_{n,tr}-\frac{3\alpha_n}{2^m}\right) \\ \vdots & \vdots & \ldots & \vdots \\ I_{1,tr}(1+\lambda_1)L\left(\beta_{1,tr}-\frac{(2k+1)\alpha_1}{2^m}\right) & I_{2,tr}(1+\lambda_2)L\left(\beta_{2,tr}-\frac{(2k+1)\alpha_2}{2^m}\right) & \ldots & I_{n,tr}(1+\lambda_n)L\left(\beta_{n,tr}-\frac{(2k+1)\alpha_n}{2^m}\right) \\ I_{1,tr}(1+\lambda_1)L\left(\beta_{1,tr}+\frac{\alpha_1}{2^m}\right) & I_{2,tr}(1+\lambda_2)L\left(\beta_{2,tr}+\frac{\alpha_2}{2^m}\right) & \ldots & I_{n,tr}(1+\lambda_n)L\left(\beta_{n,tr}+\frac{\alpha_n}{2^m}\right) \\ I_{1,tr}(1+\lambda_1)L\left(\beta_{1,tr}+\frac{3\alpha_1}{2^m}\right) & I_{2,tr}(1+\lambda_2)L\left(\beta_{2,tr}+\frac{3\alpha_2}{2^m}\right) & \ldots & I_{n,tr}(1+\lambda_n)L\left(\beta_{n,tr}+\frac{3\alpha_n}{2^m}\right) \\ \vdots & \vdots & \ldots & \vdots \\ I_{1,tr}(1+\lambda_1)L\left(\beta_{1,tr}+\frac{(2k+1)\alpha_1}{2^m}\right) & I_{2,tr}(1+\lambda_2)L\left(\beta_{2,tr}+\frac{(2k+1)\alpha_2}{2^m}\right) & \ldots & I_{n,tr}(1+\lambda_n)L\left(\beta_{n,tr}+\frac{(2k+1)\alpha_n}{2^m}\right) \end{bmatrix} \quad (29)$$

wherein $k \geq 1$ and $2k-1 \leq 2^m - 1$

Step S704: for 1-n columns in the matrix in step S703, performing the following $(4+2^m)^n$ operations respectively for different points $x_{i1,1}, x_{i2,2}, \ldots, x_{in,n}$ of $4+2^m$ rows;

$$\Delta I_\Sigma = |x_{i1,1} + x_{i2,2} + \ldots + x_{in,n}| \quad (30)$$

wherein $1 \leq i1, i2, \ldots, i_n \leq 4+2^m$;

Step S705: searching for the maximum value in the $(4+2^m)^n$ results calculated in step S704, i.e., the approximate solution $\Delta I_{\Sigma.max}'$ of a global optimal solution, and approximately replacing $\Delta I_{\Sigma.max}$ by $\Delta I_{\Sigma.max}'$ as the protection setting value in formula (9).

S8: Analyzing and verifying the solution result of the optimization problem of the non-convex constraint space.

The power electronic transformer is considered as ideal equipment to replace a conventional transformer due to significant advantages in terms of power allocation and voltage regulation, which can realize flexible regulation of power resources from the distribution network to transmission networks as well as active absorption and controllable transmission of high-proportion new energy in the distribution network. Due to the limited discharge capacity, the power electronic transformer will also have the function of limiting fault current in order to ensure no burning during failure. For the high-proportion distributed generator T-connected distribution network with a power electronic transformer as a transmission and distribution interface, all the power supplies in the system will show typical weak feed characteristics after failure, forming a fully weak-fed distribution network. The fully weak-fed distribution network is a new type of high-proportion distributed generator T-connected distribution network, which has more stringent requirements for protection setting than the distribution network with a conventional transformer as a transmission and distribution interface. Therefore, the high-distributed generator T-connected distribution network with a power electronic transformer as a transmission and distribution interface is taken as an example for analysis.

Figure 13:
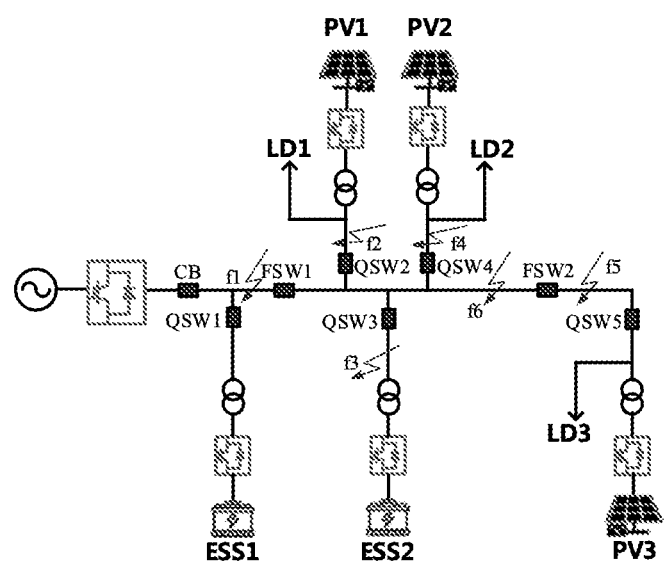
FIG. 13 is a schematic diagram of a high-proportion distributed generator T-connected distribution network with a power electronic transformer as a transmission and distribution interface of the present invention.

A simulation model is set up in PSCAD/EMTDC simulation software by using the system topology of the high-proportion distributed generator T-connected distribution network with a power electronic transformer as a transmission and distribution interface according to FIG. 13.

The distribution network has a voltage class of 10 kV and a rated frequency of 50 Hz, and the system adopts a neutral ungrounding mode. The power electronic transformer has a capacity of 10 MW, adopts the strategy of constant voltage constant frequency control/voltage dependent current limit control, and limits the fault current amplitude to less than 2 times the rated current when a short circuit fault occurs. PV1-PV3 and ESS1-ESS2 all have a rated capacity of 1 MW, output power of 1 p.u. per unit power factor before failure, and adopt the PQ control strategy, the negative sequence current suppression control strategy and the low voltage ride-through control strategy considering fault current limiting, with current limiting of 1.2 p.u. The impedance of the line is $Z_1 = 0.1 + j0.3$ Ω/km and $Z_0 = 0.3 + j0.9$ Ω/km, the impedance of T-connected lines is 1 km, and the impedance interval between adjacent T-connected lines is 2 km; and the impedance of LD1-LD3 is 2 MW. With a group of multi-terminal differential protection composed of FSW1, FSW2 and QSW2-QSW4 as an example, f1-f5 have faults outside the protected area, and f6 has faults inside the protected area.

The effectiveness of the proposed method for solving the overall maximum error of superposed multi-terminal errors is verified. For three-phase grounded short circuit at f1-f5, the current simulation values of intelligent switches are shown in Table 1, with the unit of kA (which are A-phase current, with the A-phase current phase of FSW1 as reference).

TABLE 1

Current Simulation Value of Intelligent Switches in the Case of Three-Phase Short Circuit at Different Positions

|    | FSW1          | QSW2           | QSW3           | QSW4           | FSW2           |
|----|---------------|----------------|----------------|----------------|----------------|
| f1 | 0.2714∠0.0°   | 0.0689∠192.9°  | 0.0693∠184.3°  | 0.0684∠172.6°  | 0.0684∠170.1°  |
| f2 | 1.1028∠0.0°   | 0.9001∠178.3°  | 0.0693∠201.9°  | 0.0695∠183.1°  | 0.0695∠178.0°  |
| f3 | 1.0405∠0.0°   | 0.0709∠−41.1°  | 1.0053∠171.8°  | 0.0694∠227.6°  | 0.0694∠221.2°  |
| f4 | 0.9803∠0.0°   | 0.0705∠−49.1°  | 0.0693∠−31.0°  | 1.0675∠171.7°  | 0.0694∠242.2°  |
| f5 | 0.9288∠0.0°   | 0.0809∠−58.2°  | 0.0693∠−29.1°  | 0.0710∠−47.3°  | 1.0910∠171.9°  |

Assuming that all the intelligent switches have a maximum amplitude error of $\lambda=10\%$ and a maximum angle error of $\alpha=5°$, when three-phase grounded short circuit occurs at f1-f5, the overall maximum error of differential current of superimposed multi-terminal current errors calculated by sector area traversal, sector boundary traversal and the six-point, eight-point and twelve-point fast traversal methods proposed by the present invention is shown in Table 2, wherein the sector area traversal means, in the whole sector area, selecting one point at intervals of 2% of amplitude and 1° of angle, 121 points in total; the sector boundary traversal means, on the sector boundary, selecting one point at intervals of 2% of amplitude on the straight boundary and of 1° on the arc boundary, 40 points in total; and the six-point, eight-point and twelve-point fast traversal methods are calculation methods described in the embodiment. With a computer with an Intel® Core™ i7-6700HQ CPU @2.60 GHz 2.59 GHz processor, an algorithm program is written by matlab2021b commercial software package for calculation.

TABLE 2

Overall Maximum Error and Calculation Time of Superposed Multi-terminal Errors under Different Calculation Methods in the Case of Three-Phase Short Circuit at Different Positions

|    |                        | Full Traversal | Boundary Traversal | Twelve-Point | Eight-Point | Six-Point |
|----|------------------------|----------------|--------------------|--------------|-------------|-----------|
| f1 | Maximum error (kA)     | 0.0741         | 0.0741             | 0.0741       | 0.0741      | 0.0741    |
|    | Calculation time (s)   | 3925.053       | 26.940             | 0.141        | 0.063       | 0.058     |
| f2 | Maximum error (kA)     | 0.2997         | 0.2997             | 0.2997       | 0.2997      | 0.2997    |
|    | Calculation time (s)   | 3852.813       | 27.138             | 0.157        | 0.076       | 0.051     |
| f3 | Maximum error (kA)     | 0.3507         | 0.3507             | 0.3507       | 0.3507      | 0.3507    |
|    | Calculation time (s)   | 4012.235       | 26.993             | 0.147        | 0.063       | 0.052     |
| f4 | Maximum error (kA)     | 0.3065         | 0.3065             | 0.3065       | 0.3065      | 0.3065    |
|    | Calculation time (s)   | 3965.398       | 26.326             | 0.136        | 0.061       | 0.050     |
| f5 | Maximum error (kA)     | 0.3037         | 0.3037             | 0.3037       | 0.3037      | 0.3037    |
|    | Calculation time (s)   | 3896.897       | 26.856             | 0.142        | 0.067       | 0.056     |

By comparing the results of sector area traversal with those of sector boundary traversal, it can be seen that the first characteristic introduced in Part 3 of the present invention is correct. By comparing the results of sector boundary traversal with those of the six-point, eight-point and twelve-point fast traversal methods, the correctness of the second characteristic introduced in Part 3 and the effectiveness of the proposed fast traversal calculation methods based on high discretization of non-convex space are verified. By comparing the calculation time of different calculation methods, it can be seen that the calculation time of the proposed fast traversal calculation methods is shorter, which is 4-5 orders of magnitude less than that of the sector area traversal method and the sector boundary traversal method. In order to give consideration to the calculation speed and the accuracy of the calculation results, the twelve-point fast traversal calculation method can be used for protection setting.

In order to ensure the reliability of the proposed protection scheme without misoperation in case of faults outside the protected area, the maximum value of the overall maximum error of superposed multi-terminal errors in the case pf serious three-phase grounded short circuit faults at different positions shall be selected, i.e., 0.3065 kA, multiplied by a reliability coefficient $k_{rel}=1.1$, as the protection setting value $I_{set}=1.1\times0.3065=0.3372$ kA of the proposed protection scheme.

In order to analyze the reliability of the proposed protection scheme without misoperation in case of faults outside the area, a three-phase short circuit fault is set at f1-f5 outside the protected area in the simulation model. On the basis of the fault current simulation value of each intelligent switch, an amplitude error of 10% and an angle error of 5° are superimposed, so as to obtain the fault current measured value of each intelligent switch, and on the basis of the measured value, the difference current of each phase is calculated and compared with the protection setting value to determine the action, as shown in Table 3.

TABLE 3

Differential Current and Protection Action of Three-Phase Short Circuit Fault outside Protected Area

|                      |         | f1        | f2        | f3        | f4        | f5        |
|----------------------|---------|-----------|-----------|-----------|-----------|-----------|
| Differential current (kA) | Phase A | 0.0546 | 0.2211 | 0.2256 | 0.2370 | 0.2241 |
|                      | Phase B | 0.0476    | 0.1927    | 0.1966    | 0.1968    | 0.1953    |
|                      | Phase C | 0.0511    | 0.2070    | 0.2112    | 0.2163    | 0.2117    |
| Protection action    |         | No action | No action | No action | No action | No action |

It can be seen that when each intelligent switch has an amplitude error of 10% and an angle error of 5°, the protection will not misoperate when a serious three-phase short circuit fault occurs outside the protected area, so the proposed protection scheme has good reliability.

In order to analyze the sensitivity of the proposed protection scheme when a fault occurs inside the protected area, a phase-to-phase fault of the two phases A and B is set at f6 inside the protected area of the simulation model, and the transition resistance $Z_f$ is respectively 1Ω, 5Ω, 10Ω and 20Ω. On the basis of the fault current simulation value of each intelligent switch, an amplitude error of 10% and an angle error of 5° are superimposed to obtain the fault current measured value of each intelligent switch, and on the basis of the measured value, the difference current of each phase is calculated and compared with the protection setting value to determine the action, as shown in Table 4.

TABLE 4

Differential Current and Protection Action of Phase-To-Phase Fault of Two Phases inside Protected Area

| | | $Z_f$ = 1Ω | $Z_f$ = 5Ω | $Z_f$ = 10Ω | $Z_f$ = 20Ω |
|---|---|---|---|---|---|
| Differential current (kA) | Phase A | 0.8554 | 0.7276 | 0.5288 | 0.3860 |
| | Phase B | 0.8493 | 0.7114 | 0.5202 | 0.3749 |
| | Phase C | 0.0704 | 0.0649 | 0.0603 | 0.0523 |
| Protection action | | Action | Action | Action | Action |

It can be seen that when each intelligent switch has an amplitude error of 10% and an angle error of 5°, the protection can act reliably when a phase-to-phase short circuit fault with larger transition resistance occurs in the protected area, and the proposed protection scheme has good sensitivity.

In addition, the conditions with an amplitude error less than 10% and an angular error less than 5° are randomly superposed in the simulation values of different fault positions and different fault types as the measured value to conduct a large amount of example analysis. The results show that the multi-terminal differential protection setting scheme for a distribution network proposed by the present invention has sufficient sensitivity and reliability.

The present invention proposes a fast traversal method based on high discretization of non-convex space, which can quickly and accurately calculate the overall maximum error of differential current of superimposed multi-terminal current phasor errors, settling the problem of solving the setting value of multi-terminal current differential protection.

The multi-terminal differential protection setting method for a distributed generator T-connected distribution network proposed by the preset invention can accurately identify internal faults and external faults of the protected area in the high-proportion distributed generator T-connected distribution network, with sufficient reliability and sensitivity, and can quickly and accurately calculate the overall maximum error of differential current of superimposed multi-terminal current phasor errors.

What is claimed is:

1. A multi-terminal differential protection setting method for a distributed generator T-connected distribution network, comprising the following steps:

S1: connecting a distributed generator into a distribution network by means of T-connection, and making the distributed generator equivalent to a positive sequence current source controlled by grid interconnection voltage, wherein an equivalent model for making the distributed generator equivalent to the positive sequence current source controlled by grid interconnection voltage is:

$$U^*_{pcc(1)} = U_{pcc(1)}/U_{pcc(1).N} \quad (1)$$

$$I_{DGm.N} = \sqrt{2} P_{ref.N}/3U_{pcc(1).N}$$

$$i_{q(1)} = \begin{cases} 0, & U^*_{pcc(1)} > 0.9 \\ -2(1 - U^*_{pcc(1)})I_{DGm.N}, & 0.4 \leq U^*_{pcc(1)} \leq 0.9 \\ -1.2I_{DGm.N}, & U^*_{pcc(1)} < 0.4 \end{cases}$$

$$i_{d(1)} = \min\left(\frac{\sqrt{2} P_{ref}}{3U_{pcc(1)}}, \sqrt{(1.2I_{DGm.N})^2 - i^2_{q(1)}}\right)$$

$$\dot{I}_{DG} = \begin{cases} \frac{\sqrt{i^2_{d(1)} + i^2_{q(1)}}}{\sqrt{2}} \angle\left(\arctan\frac{i_{q(1)}}{i_{d(1)}} + \varphi\right), & i_{d(1)} \neq 0 \\ \frac{\sqrt{i^2_{d(1)} + i^2_{q(1)}}}{\sqrt{2}} \angle(-90° + \varphi), & i_{d(1)} = 0 \end{cases}$$

wherein $U_{pcc(1)}$ is an effective value of grid interconnection positive sequence phase voltage, $U_{pcc(1).N}$ is an effective value of grid interconnection positive sequence phase voltage in the rated running state, $I_{DGm.N}$ is an amplitude of rated current, $P_{ref.N}$ is a rated active reference value, $P_{ref}$ is an active reference value before failure, $\dot{I}_{DG}$ is output current, $i_{d(1)}$ and $i_{q(1)}$ are a d-axis component and a q-axis component of the positive sequence component of the output current, and φ is the phase of $\dot{U}_{pcc(1)}$;

S2: acquiring multi-terminal current according to the positive sequence current source controlled by grid interconnection voltage;

S3: calculating the overall maximum error of superimposed multi-terminal current errors according to the multi-terminal current;

S4: establishing non-convex constraint space according to the overall maximum error of superimposed multi-terminal current errors;

S5: reducing and discretizing the non-convex constraint space;

S6: obtaining the optimization problem of the non-convex constraint space based on the reducing and discretizing results of the non-convex constraint space;

S7: solving the optimization problem of the non-convex constraint space;

S8: analyzing and verifying the solution result of the optimization problem of the non-convex constraint space;

S9: controlling the distributed generator T-connected distribution network based on the solution result of the optimization problem of the non-convex constraint space.

2. The multi-terminal differential protection setting method for a distributed generator T-connected distribution network according to claim 1, wherein step S3 of calculating the overall maximum error of superimposed multi-terminal current errors according to the multi-terminal current comprises:

expressing the power frequency current phasor involved in a group of n(n≥3)-terminal current differential protection by a set P:

$$P = \{\dot{I}_1, \dot{I}_2, \dots, \dot{I}_n\} \quad (2)$$

the action criterion of the multi-terminal current differential protection is:

$$I_{op} \geq I_{set} \quad (3)$$

wherein $I_{op}$ is differential current; and $I_{set}$ is a protection setting value;

expressing the relationship between the measured value and the actual value of each power frequency current phasor as follows:

$$\dot{I}_{i.ms}=\dot{I}_{i.tr}+\Delta\dot{I}_i \qquad (4)$$

i=1, 2, . . . , n wherein $\dot{I}_{i.ms}$ represents the measured value of the power frequency current phasor, $\dot{I}_{i.tr}$ represents the actual value of the power frequency current phasor, and $\Delta\dot{I}_i$ represents the error between the actual value and the measured value;

at this moment, the differential current is:

$$I_{op} = |\dot{I}_{1.ms} + \dot{I}_{2.ms} + \ldots + \dot{I}_{n.ms}| \qquad (5)$$
$$= |\dot{I}_{1.tr} + \Delta\dot{I}_1 + \dot{I}_{2.tr} + \Delta\dot{I}_2 + \ldots + \dot{I}_{n.tr} + \Delta\dot{I}_n|$$

according to the Kirchhoff's Current Law, meeting the formula below during normal operation and during failure outside a protected area:

$$\dot{I}_{1.tr}+\dot{I}_{2.tr}+\ldots+\dot{I}_{n.tr}=0 \qquad (6)$$

according to formula (5) and formula (6), the differential current during normal operation and during failure outside a protected area is:

$$I_{op}=|\Delta\dot{I}_1+\Delta\dot{I}_2+\ldots+\Delta\dot{I}_n| \qquad (7)$$

denoting the overall maximum error of superimposed multi-terminal current errors as $\Delta I_\Sigma$:

$$\Delta I_\Sigma=|\Delta\dot{I}_1+\Delta\dot{I}_2+\ldots+\Delta\dot{I}_n| \qquad (8).$$

3. The multi-terminal differential protection setting method for a distributed generator T-connected distribution network according to claim 1, wherein step S4 of establishing non-convex constraint space according to the overall maximum error of superimposed multi-terminal current errors comprises:

according to $\Delta\dot{I}^*_1, \Delta\dot{I}^*_2, \ldots, \Delta\dot{I}^*_{n-1}, \Delta\dot{I}^*_n$, establishing a sector shadow area, wherein the phasors of $\Delta\dot{I}^*_1, \Delta\dot{I}^*_2, \ldots, \Delta\dot{I}^*_{n-1}, \Delta\dot{I}^*_n$ end on the boundaries of the respective sector shadow area;

if the position relationship between $\Delta\dot{I}^*_1+\Delta\dot{I}^*_2+\ldots+\Delta\dot{I}^*_{n-1}$ and $\Delta\dot{I}^*_n$ in a complex plane is that $\Delta\dot{I}^*_1+\Delta\dot{I}^*_2+\ldots+\Delta\dot{I}^*_{n-1}$ and $\Delta\dot{I}^*_n$ are at an angle of $\theta^*_n$;

wherein $\theta^*_n$ is the phase difference between phasors $\Delta\dot{I}^*_1+\Delta\dot{I}^*_2+\ldots+\Delta\dot{I}^*_{n-1}$ and $\Delta\dot{I}^*_n$, and $\theta^*_n\in[0, 2\pi)$;

according to the Law of Cosines, $\Delta I_{\Sigma.max}$ is:

$$\Delta I^2_{\Sigma.max} = \qquad (14)$$
$$|\Delta\dot{I}^*_1+\Delta\dot{I}^*_2+\ldots+\Delta\dot{I}^*_{n-1}+\Delta\dot{I}^*_n|^2 = |\Delta\dot{I}^*_1+\Delta\dot{I}^*_2+\ldots+\Delta\dot{I}^*_{n-1}|^2 +$$
$$|\Delta\dot{I}^*_n|^2 - 2\cdot|\Delta\dot{I}^*_n|\cdot|\Delta\dot{I}^*_1+\Delta\dot{I}^*_2+\ldots+\Delta\dot{I}^*_{n-1}|\cos(\pi - \theta^*_n)$$

denoting $\Delta\dot{I}_n$ having the phase difference of $\theta^*_n$ from $\Delta\dot{I}^*_1+\Delta\dot{I}^*_2+\ldots+\Delta\dot{I}^*_{n-1}$ as $\Delta\dot{I}_n^{\theta_n^*}$, and denoting $\Delta\dot{I}_n^{\theta_n^*}$ ending on the boundaries of the shadow area as $\Delta\dot{I}_n^{\theta_n^*, max}$;

since $\Delta\dot{I}^*_1, \Delta\dot{I}^*_2, \ldots, \Delta\dot{I}^*_{n-1}, \Delta\dot{I}_n^{\theta_n^*}$ are independent of each other, the derivative of $\Delta I_\Sigma^2$ with respect to $|\Delta\dot{I}_n^{\theta_n^*}|$ is:

$$\frac{d(\Delta I_\Sigma^2)}{d(|\Delta\dot{I}_n^{\theta_n^*}|)} = 2|\Delta\dot{I}_n^{\theta_n^*}| - 2\cdot\cos(\pi - \theta^*_n)\cdot|\Delta\dot{I}^*_1+\Delta\dot{I}^*_2+\ldots+\Delta\dot{I}^*_{n-1}| \qquad (15)$$

the second derivative of $\Delta I_\Sigma^2$ with respect to $|\Delta\dot{I}_n^{\theta_n^*}|$ is:

$$\frac{d^2(\Delta I_\Sigma^2)}{d(|\Delta\dot{I}_n^{\theta_n^*}|)^2} = 2 > 0 \qquad (16)$$

according to formula (14) to formula (16), since the quadratic term coefficients of the second derivative and the first derivative are both larger than 0, as $|\dot{I}_n^{\theta_n^*}|$ changes from 0 to $|\Delta\dot{I}_n^{\theta_n^*, max}|$, $\Delta I_\Sigma$ has at most one extreme point which is a minimum point;

$\Delta I_\Sigma$ is maximum when $\Delta\dot{I}_n^{\theta_n^*}=0$ or $\Delta\dot{I}_n^{\theta_n^*}=\Delta\dot{I}_n^{\theta_n^*, max}$;

at least one $\Delta\dot{I}_n^\xi$ inevitably exists in the sector shadow area so that:

$|\Delta\dot{I}^*_1+\Delta\dot{I}^*_2+\ldots+\Delta\dot{I}^*_{n-1}+\Delta\dot{I}_n^\xi|>|\Delta\dot{I}^*_1+\Delta\dot{I}^*_2+\ldots +\Delta\dot{I}^*_{n-1}+0|$ \qquad (17)

when the overall error of superimposed multi-terminal current errors is maximum, $\Delta\dot{I}^*_n=\Delta\dot{I}_n^{\theta_n^*, max}$;

numbering four boundaries of the sector shadow area corresponding to $\Delta\dot{I}_n$, the boundaries 1 and 2 are straight boundaries, and the boundaries 3 and 4 are arc boundaries;

wherein $\Delta\dot{I}_l$ ending on the boundary 1 can be decomposed into:

$$\Delta\dot{I}_n=\Delta\dot{I}^*_{n,x}+\Delta\dot{I}_{n,y} \qquad (18)$$

wherein $\Delta\dot{I}^*_{n,x}$ is the projection of $\Delta\dot{I}_n$ on the vertical line of the boundary 1, and $\Delta\dot{I}_{n,y}$ is the projection of $\Delta\dot{I}_n$ on the boundary 1;

when $\Delta\dot{I}^*_{n,y}$ ends near the $A_1$ side, $\Delta I_{\Sigma.max}^2$ is:

$$\Delta I^2_{\Sigma.max} = |\Delta\dot{I}^*_1 + \Delta\dot{I}^*_2 + \ldots + \Delta\dot{I}^*_{n-1} + \Delta\dot{I}^*_n|^2 = \qquad (19)$$
$$|\Delta\dot{I}^*_1 + \Delta\dot{I}^*_2 + \ldots + \Delta\dot{I}^*_{n-1} + \Delta\dot{I}^*_{n,x} + \Delta\dot{I}^*_{n,y}|^2 = |\Delta\dot{I}^*_1 + \Delta\dot{I}^*_2 + \ldots + \Delta\dot{I}^*_{n,x}|^2 +$$
$$|\Delta\dot{I}^*_{n,y}|^2 - 2\cdot|\Delta\dot{I}^*_{n,y}|\cdot|\Delta\dot{I}^*_1 + \Delta\dot{I}^*_2 + \ldots + \Delta\dot{I}^*_{n,x}|\cos\left(\frac{\pi}{2} - \delta^*_n\right)$$

wherein $\delta^*_n$ is the phase difference between $\Delta\dot{I}^*_1+\Delta\dot{I}^*_2+\ldots+\Delta\dot{I}^*_{n-1}$ and $\Delta\dot{I}^*_{n,x}$, and $\delta^*_n\in[0, 2\pi)$;

since $\Delta\dot{I}^*_1, \Delta\dot{I}^*_2, \ldots, \Delta\dot{I}^*_{n-1}, \Delta\dot{I}^*_{n,x}, \Delta\dot{I}_{n,y}$ are independent of each other, the derivative of $\Delta I_\Sigma^2$ with respect to $|\Delta\dot{I}_{n,y}|$ is:

$$\frac{d(\Delta I_\Sigma^2)}{d(|\Delta\dot{I}_{n,y}|)} = 2|\Delta\dot{I}_{n,y}| - 2\cos\left(\frac{\pi}{2} - \delta^*_n\right)\cdot|\Delta\dot{I}^*_1 + \Delta\dot{I}^*_2 + \ldots + \Delta\dot{I}^*_{n-1} + \Delta\dot{I}^*_{n,x}| \qquad (20)$$

the second derivative of $\Delta I_\Sigma^2$ with respect to $|\Delta\dot{I}_{n,y}|$ is:

$$\frac{d^2(\Delta I_\Sigma^2)}{d(|\Delta\dot{I}_{n,y}|)^2} = 2 > 0 \qquad (21)$$

when $\Delta\dot{I}^*_{n,y}$ ends near the $A_2$ side, $\Delta I_{\Sigma.max}^2$ is:

$$\Delta I^2_{\Sigma.max} = |\Delta\dot{I}^*_1 + \Delta\dot{I}^*_2 + \ldots + \Delta\dot{I}^*_{n-1} + \Delta\dot{I}^*_n| = \qquad (22)$$
$$|\Delta\dot{I}^*_1 + \Delta\dot{I}^*_2 + \ldots + \Delta\dot{I}^*_{n-1} + \Delta\dot{I}^*_{n,x} + \Delta\dot{I}^*_{n,y}|^2 = |\Delta\dot{I}^*_1 + \Delta\dot{I}^*_2 + \ldots + \Delta\dot{I}^*_{n,x}|^2 +$$
$$|\Delta\dot{I}^*_{n,y}|^2 - 2\cdot|\Delta\dot{I}^*_{n,y}|\cdot|\Delta\dot{I}^*_1 + \Delta\dot{I}^*_2 + \ldots + \Delta\dot{I}^*_{n,x}|\cos\left(\frac{3\pi}{2} - \delta^*_n\right)$$

at this moment, the derivative of $\Delta I_\Sigma^2$ with respect to $|\Delta\dot{I}_{n,y}|$ is:

$$\frac{d(\Delta I_\Sigma^2)}{d(|\Delta I_{n,y}|)} = 2|\Delta I_{n,y}| - 2\cos\left(\frac{3\pi}{2} - \delta_n^*\right) \cdot |\Delta I_1^* + \Delta I_2^* + \ldots + \Delta I_{n-1}^* + \Delta I_{n,x}^*| \quad (23)$$

when $\Delta \dot{I}_{n,y}^*$ ends near the $A_2$ side, the second derivative of $\Delta I_\Sigma^2$ with respect to $|\Delta \dot{I}_{n,y}|$ is the same as formula (21):

denoting $\Delta \dot{I}_{n,y}$ ending at $A_1$ as $\Delta \dot{I}_{n,y}^{A1}$, and denoting $\Delta \dot{I}_{n,y}$ ending at $A_2$ as $\Delta \dot{I}_{n,y}^{A2}$;

respectively denoting derivatives in formula (20) and formula (23) as $f_{n,y}^1$ and $f_{n,y}^2$.

4. The multi-terminal differential protection setting method for a distributed generator T-connected distribution network according to claim 1, wherein step S7 of solving the optimization problem of the non-convex constraint space comprises the following specific steps:

step S701: inputting data matrixes of $\dot{I}_{1,tr}$-$\dot{I}_{n,tr}$, $\lambda_1$-$\lambda_n$ and $\alpha_1$-$\alpha_n$;

$$\begin{bmatrix} I_{1,tr} & \beta_{1,tr} & \lambda_1 & \alpha_1 \\ I_{2,tr} & \beta_{2,tr} & \lambda_2 & \alpha_2 \\ \vdots & \vdots & \vdots & \vdots \\ I_{n,tr} & \beta_{n,tr} & \lambda_n & \alpha_n \end{bmatrix} \quad (28)$$

wherein $I_{1,tr}$-$I_{n,tr}$ are amplitudes of $\dot{I}_{1,tr}$-$\dot{I}_{n,tr}$, and $\beta_{1,tr}$-$\beta_{1,tr}$ are phases of $\dot{I}_{1,tr}$-$\dot{I}_{n,tr}$;

wherein the specific values of $\lambda_1$-$\lambda_n$ and $\alpha_1$-$\alpha_n$ can be determined by the type of a current transformer and the data synchronization accuracy of a data synchronization method, and $\dot{I}_{1,tr}$-$\dot{I}_{n,tr}$ are fault current flowing through primary and secondary fusing intelligent switches when a fault outside the protected area is most severe;

step S702: determining to discretize the constraint space of the optimization problem into $(4+2m)n$ points according to $\lambda_1\lambda_n$ and $\alpha_1$-$\alpha_n$;

step S703: generating a discrete point matrix;

$$\begin{bmatrix}
I_{1,tr}(1-\lambda_1)\angle(\beta_{1,tr}-\alpha_1) & I_{2,tr}(1-\lambda_2)\angle(\beta_{2,tr}-\alpha_2) & \ldots & I_{n,tr}(1-\lambda_n)\angle(\beta_{n,tr}-\alpha_n) \\
I_{1,tr}(1-\lambda_1)\angle(\beta_{1,tr}+\alpha_1) & I_{2,tr}(1-\lambda_2)\angle(\beta_{2,tr}+\alpha_2) & \ldots & I_{n,tr}(1-\lambda_n)\angle(\beta_{n,tr}+\alpha_n) \\
I_{1,tr}(1+\lambda_1)\angle(\beta_{1,tr}-\alpha_1) & I_{2,tr}(1+\lambda_2)\angle(\beta_{2,tr}-\alpha_2) & \ldots & I_{n,tr}(1+\lambda_n)\angle(\beta_{n,tr}-\alpha_n) \\
I_{1,tr}(1+\lambda_1)\angle(\beta_{1,tr}+\alpha_1) & I_{2,tr}(1+\lambda_2)\angle(\beta_{2,tr}+\alpha_2) & \ldots & I_{n,tr}(1+\lambda_n)\angle(\beta_{n,tr}+\alpha_n) \\
I_{1,tr}(1+\lambda_1)\angle\left(\beta_{1,tr}-\frac{\alpha_1}{2^m}\right) & I_{2,tr}(1+\lambda_2)\angle\left(\beta_{2,tr}-\frac{\alpha_2}{2^m}\right) & \ldots & I_{n,tr}(1+\lambda_n)\angle\left(\beta_{n,tr}-\frac{\alpha_n}{2^m}\right) \\
I_{1,tr}(1+\lambda_1)\angle\left(\beta_{1,tr}-\frac{3\alpha_1}{2^m}\right) & I_{2,tr}(1+\lambda_2)\angle\left(\beta_{2,tr}-\frac{3\alpha_2}{2^m}\right) & \ldots & I_{n,tr}(1+\lambda_n)\angle\left(\beta_{n,tr}-\frac{3\alpha_n}{2^m}\right) \\
\vdots & \vdots & \ldots & \vdots \\
I_{1,tr}(1+\lambda_1)\angle\left(\beta_{1,tr}-\frac{(2k+1)\alpha_1}{2^m}\right) & I_{2,tr}(1+\lambda_2)\angle\left(\beta_{2,tr}-\frac{(2k+1)\alpha_2}{2^m}\right) & \ldots & I_{n,tr}(1+\lambda_n)\angle\left(\beta_{n,tr}-\frac{(2k+1)\alpha_n}{2^m}\right) \\
I_{1,tr}(1+\lambda_1)\angle\left(\beta_{1,tr}+\frac{\alpha_1}{2^m}\right) & I_{2,tr}(1+\lambda_2)\angle\left(\beta_{2,tr}+\frac{\alpha_2}{2^m}\right) & \ldots & I_{n,tr}(1+\lambda_n)\angle\left(\beta_{n,tr}+\frac{\alpha_n}{2^m}\right) \\
I_{1,tr}(1+\lambda_1)\angle\left(\beta_{1,tr}+\frac{3\alpha_1}{2^m}\right) & I_{2,tr}(1+\lambda_2)\angle\left(\beta_{2,tr}+\frac{3\alpha_2}{2^m}\right) & \ldots & I_{n,tr}(1+\lambda_n)\angle\left(\beta_{n,tr}+\frac{3\alpha_n}{2^m}\right) \\
\vdots & \vdots & \ldots & \vdots \\
I_{1,tr}(1+\lambda_1)\angle\left(\beta_{1,tr}+\frac{(2k+1)\alpha_1}{2^m}\right) & I_{2,tr}(1+\lambda_2)\angle\left(\beta_{2,tr}+\frac{(2k+1)\alpha_2}{2^m}\right) & \ldots & I_{n,tr}(1+\lambda_n)\angle\left(\beta_{n,tr}+\frac{(2k+1)\alpha_n}{2^m}\right)
\end{bmatrix} \quad (29)$$

wherein $k \geq 1$ and $2k-1 \leq 2^m-1$ step S704: for 1-n columns in the matrix in step S703, performing the following $(4+2^m)^n$ operations respectively for different points $x_{i1,1}, x_{i2,2}, \ldots, x_{in,n}$ of $4+2^m$ rows;

$$\Delta I_\Sigma = |x_{i1,1} + x_{i2,2} + \ldots + x_{in,n}| \quad (30)$$

wherein $1 \leq i1, i2, \ldots, i_n \leq 4+2^m$;

step S705: searching for the maximum value in the $(4+2^m)^n$ results calculated in step S704, i.e., the approximate solution $\Delta I_{\Sigma.max}'$ of a global optimal solution, and approximately replacing $\Delta I_{\Sigma.max}$ by $\Delta I_{\Sigma.max}'$ as the protection setting value in formula (9).

5. The multi-terminal differential protection setting method for a distributed generator T-connected distribution network according to claim 1, wherein step S8 of analyzing the solution result of the optimization problem of the non-convex constraint space comprises:

setting up a simulation model in PSCAD/EMTDC simulation software by using the system topology of a high-proportion distributed generator T-connected distribution network with a power electronic transformer as a transmission and distribution interface.

6. The multi-terminal differential protection setting method for a distributed generator T-connected distribution network according to claim 1, wherein step S8 of verifying the solution result of the optimization problem of the non-convex constraint space comprises:

conducting contrast verification through results of sector boundary traversal and six-point, eight-point and twelve-point fast traversal methods.

\* \* \* \* \*